US008477963B2

(12) United States Patent
Sugiyama et al.

(10) Patent No.: US 8,477,963 B2
(45) Date of Patent: Jul. 2, 2013

(54) METHOD, APPARATUS, AND COMPUTER PROGRAM FOR SUPPRESSING NOISE

(75) Inventors: Akihiko Sugiyama, Tokyo (JP); Masanori Katou, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/532,185

(22) Filed: Jun. 25, 2012

(65) Prior Publication Data

US 2012/0288115 A1 Nov. 15, 2012

Related U.S. Application Data

(62) Division of application No. 12/065,472, filed as application No. PCT/JP2006/316849 on Aug. 28, 2006, now Pat. No. 8,233,636.

(30) Foreign Application Priority Data

Sep. 2, 2005 (JP) ................................ 2005-255669

(51) Int. Cl.
*H04B 15/00* (2006.01)

(52) U.S. Cl.
USPC ........................................................ 381/94.1

(58) Field of Classification Search
USPC ...................... 381/94.1, 92–94; 704/203, 206
See application file for complete search history.

(56) References Cited

U.S. PATENT DOCUMENTS 5,659,622 A * 8/1997 Ashley ........................ 381/94.1
5,680,508 A 10/1997 Liu
5,706,395 A 1/1998 Arslan et al.
5,809,455 A 9/1998 Nishiguchi et al.
6,088,668 A * 7/2000 Zack ............................ 704/225
6,366,880 B1 4/2002 Ashley
7,343,283 B2 3/2008 Ashley et al.
7,788,093 B2 8/2010 Furuta et al.
7,873,114 B2 1/2011 Lin
7,970,150 B2 * 6/2011 Oxford .......................... 381/92
8,126,161 B2 2/2012 Togami et al.
8,352,258 B2 * 1/2013 Yamanashi et al. ........... 704/230
2001/0053229 A1 12/2001 Azizi

FOREIGN PATENT DOCUMENTS

EP 1 349 148 A1 10/2003
JP 02-272499 11/1990
JP 7-325583 A 12/1995

(Continued)

OTHER PUBLICATIONS

"Enhanced Variable Rate Codec, Speech Service Option 3-Forwideband Spread Spectrum Digital Systems", TIA/EIA/IS-127-1, pp. 1-10 (Sep. 1996).

(Continued)

*Primary Examiner* — Nathan Ha
(74) *Attorney, Agent, or Firm* — Dickstein Shapiro LLP

(57) ABSTRACT

A method, an apparatus, and a computer program, which can suppress a low frequency range component with a small amount of calculation, and can achieve a noise suppression of high quality, are provided. The noise superposed in a desired signal of an input signal is suppressed by converting the input signal to a frequency domain signal; correcting an amplitude of the frequency domain signal to obtain an amplitude corrected signal; obtaining an estimated noise by using the amplitude corrected signal; determining a suppression coefficient by using the estimated noise and the amplitude corrected signal; and weighting the amplitude corrected signal with the suppression coefficient.

2 Claims, 21 Drawing Sheets

FOREIGN PATENT DOCUMENTS

| | | | |
|---|---|---|---|
| JP | 08-130478 | | 5/1996 |
| JP | 10-513030 | T | 12/1998 |
| JP | 11-133996 | | 5/1999 |
| JP | 11-289312 | | 10/1999 |
| JP | 2001-350498 | A | 12/2001 |
| JP | 2002-023800 | | 1/2002 |
| JP | 2002-204175 | A | 7/2002 |
| JP | 2003-131689 | | 5/2003 |
| JP | 2003-140700 | | 5/2003 |
| JP | 2003-531548 | | 10/2003 |
| JP | 2003-339709 | A | 12/2003 |
| JP | 2005-049364 | | 2/2005 |
| KR | 10-0286719 | | 4/2001 |

OTHER PUBLICATIONS

Japanese Office Action, dated Mar. 13, 2012, issued for counterpart Japanese Application No. 2007-534337.

* cited by examiner

METHOD, APPARATUS, AND COMPUTER PROGRAM FOR SUPPRESSING NOISE

CROSS REFERENCE TO RELATED APPLICATIONS

The present application is a divisional of application Ser. No. 12/065,472, filed Feb. 29, 2008, which is a §371 application of PCT/JP06/316849, filed Aug. 28, 2006, and which claims priority to Japanese patent application No. 2005-255669, the entire contents of each of which are incorporated herein by reference.

TECHNICAL FIELD

The present invention relates to a noise suppressing method and a noise suppressing apparatus for suppressing a noise superposed on a desired voice signal, and a computer program used for suppressing the noise.

BACKGROUND ART

A noise suppressor (noise suppressing system) is a system for suppressing noise superposed on a desired voice signal, and generally operates so as to suppress noise mixed in the desired voice signal by estimating the power spectrum of a noise component with an input signal converted to a frequency domain, and subtracting this estimated power spectrum from the input signal. The noise suppressor can be also applied to suppress irregular noise by continuously estimating the power spectrum of a noise component. The noise suppressor is, for example, a method which is adopted as a standard for a North American portable phone, and is disclosed in Non-Patent Document 1 (Technical Requirements (TR45). ENHANCED VARIABLE RATE CODEC, SPEECH SERVICE OPTION 3 FOR WIDEBAND SPREAD SPECTRUM DIGITAL SYSTEMS, TIA/EIA/IS-127-1, SEPTEMBER, 1996), and Patent Document 1 (Japanese Patent Laid-Open No. 2002-204175).

A digital signal obtained by analog-digital (AD) converting of an output signal of a microphone for collecting a sound wave is normally delivered as an input signal to the noise suppressor. A high-pass filter is generally placed between an AD converter and the noise suppressor to mainly suppress a low frequency range component added when collecting a sound in the microphone and when AD-converting the sound. Such a configuration example is, for example, disclosed in Patent Document 2 (U.S. Pat. No. 5,659,622).

FIG. 1 illustrates such a structure in which the noise suppressor of Patent Document 1 is combined with the high-pass filter of Patent Document 2.

A noisy speech signal (a signal in which a desired voice signal and noise are mixed) is delivered to input terminal 11 as a sample value series. A noisy speech signal sample is delivered to high-pass filter 17, and is delivered to frame divider 1 after a low frequency range component thereof is suppressed. It is absolutely necessary to suppress the low frequency range component for maintaining a linearity of the input noisy speech, and realizing sufficient signal processing performance. Frame divider 1 divides the noisy speech signal sample into frames whose unit is a specific number, and transfers the frames to window processor 2. Window processor 2 multiplies the noisy speech signal sample divided into frames by a window function, and transfers the result to Fourier transformer 3.

Fourier transformer 3 Fourier-transforms the window-processed noisy speech signal sample to divide the signal sample into a plurality of frequency components, and multiplex an amplitude value to deliver the plurality of frequency components to estimated noise calculator 52, noise suppression coefficient generator 82, and multiplexed multiplier 16. A phase is transferred to inverse Fourier transformer 9. Estimated noise calculator 52 estimates the noise for each of the plurality of delivered frequency components, and transfers the noise to noise suppression coefficient generator 82. An example of a method for estimating noise is such a method in which a noisy speech is weighted with a past signal-to-noise ratio to be designated as a noise component, and the details are described in Patent Document 1.

Noise suppression coefficient generator 82 generates a noise suppression coefficient for obtaining enhanced voice in which noise is suppressed for each of the plurality of frequency components by multiplying the noisy speech by the estimated noise. As an example for generating the noise suppression coefficient, a least mean square short time spectrum amplitude method for minimizing an average square power of the enhanced voice is widely used, and the details are described in Patent Document 1.

The noise suppression coefficient generated for each frequency is delivered to multiplexed multiplier 16. Multiplexed multiplier 16 multiplies, for each frequency, the noisy speech delivered from Fourier transformer 3 by the noise suppression coefficient delivered from noise suppression coefficient generator 82, and transfers the product to inverse Fourier transformer 9 as an amplitude of the enhanced voice. Inverse Fourier transformer 9 performs inverse-Fourier-transformation by combining the enhanced voice amplitude delivered from multiplexed multiplier 16 and the phase of the noisy speech, the phase being delivered from Fourier transformer 3, and delivers the inverse-Fourier-transformed signal to frame synthesizer 10 as an enhanced voice signal sample. Frame synthesizer 10 synthesizes an output voice sample of the corresponding frame by using the enhanced voice sample of an adjacent frame to deliver the synthesized sample to output terminal 12.

DISCLOSURE OF THE INVENTION

High-pass filter 17 suppresses a frequency component close to a direct current. Normally, a component whose frequency is equal to or higher than 100 Hz to 120 Hz passes through high-pass filter 17 without suppressing. While a configuration of high-pass filter 17 can be designated as a filter of a finite impulse response (FIR) type or an infinite impulse response (IIR) type, a sharp pass band terminal characteristic is necessary, so that the latter is normally used. The IIR type filter is known in that the transfer function is expressed as a rational function, and the sensitivity of denominator coefficients is extremely high. Thus, the following is a problem, when high-pass filter 17 is realized by a finite word length calculation, it is necessary to frequently use a double-precision calculation to achieve the enough accuracy, so that an amount of calculation becomes large. On the other hand, if high-pass filter 17 is eliminated to reduce the amount of calculation, it becomes difficult to maintain the linearity of an input signal, and it becomes impossible to achieve high quality noise suppression.

An object of the present invention is to provide a noise suppressing method and a noise suppressing apparatus which can suppress a low frequency range component with a small amount of calculation, and achieve high quality noise suppression.

The noise suppressing method according to the present invention converts the input signal to a frequency domain signal, corrects an amplitude of the frequency domain signal to obtain an amplitude corrected signal, obtains the estimated noise by using the amplitude corrected signal, determines a suppression coefficient by using the estimated noise and the amplitude corrected signal, and weights the amplitude corrected signal with the suppression coefficient.

On the other hand, the noise suppressing apparatus according to the present invention is provided with a converter that converts the input signal to a frequency domain signal, an amplitude corrector that corrects the amplitude of the frequency domain signal to obtain an amplitude corrected signal, a noise estimator that obtains the estimated noise by using the amplitude corrected signal, a suppression coefficient generator that determines the suppression coefficient by using the estimated noise and the amplitude corrected signal, and a multiplier that weights the amplitude corrected signal with the suppression coefficient.

A computer program for processing a signal for noise suppression according to the present invention includes a process that converts the input signal to a frequency domain signal, a process that corrects an amplitude of the frequency domain signal to obtain an amplitude corrected signal, a process that obtains the estimated noise by using the amplitude corrected signal, a process that determines the suppression coefficient by using the estimated noise and the amplitude corrected signal, and a process that weights the amplitude corrected signal with the suppression coefficient.

In particular, the method and the apparatus for suppressing noise according to the present invention are characterized by suppressing a low frequency range component of a Fourier-transformed signal. More specifically, the apparatus is characterized by including an amplitude corrector that suppresses a low frequency range component of an amplitude of a Fourier-transformed output, and a phase corrector that corrects a phase corresponding to an amplitude modification of the low frequency range component for correcting a phase of the Fourier-transformed output.

According to the present invention, the amplitude of the signal converted to a frequency domain is multiplied by a constant, and a constant is added to the phase, so that the method and the apparatus can be realized with a single accurate calculation, and high quality noise suppression can be achieved with a small amount of calculation.

| Description of Symbols | |
|---|---|
| 1 | frame divider |
| 2, 20 | window processor |
| 3 | Fourier transformer |
| 4, 5049 | counter |
| 5, 52 | estimated noise calculator |
| 6, 1402 | frequency domain SNR calculator |
| 7 | estimated apriori SNR calculator |
| 8, 82 | noise suppression coefficient generator |
| 9 | inverse Fourier transformer |
| 10 | frame synthesizer |
| 11 | input terminal |
| 12 | output terminal |
| 13, 16, 704, 705, 1404 | multiplexed multiplier |
| 14 | weighted noisy speech calculator |
| 15 | suppression coefficient corrector |
| 17 | high-pass filter |
| 18 | amplitude corrector |
| 19 | phase corrector |
| 21 | voice absence probability memory |
| 22 | offset eliminator |
| 501, 502, 1302, 1303, 1422, 1423, 1495, 1502, 1503, 1801, 1901, 7013, 7072, 7074 | separator |
| 503, 1304, 1424, 1475, 1504, 1803, 1903, 7014, 7075 | multiplexer |
| $504_0$ to $504_{K-1}$ | frequency domain estimated noise calculator |
| 520 | update decider |
| 701 | multiple value range limiter |
| 702 | aposteriori SNR memory |
| 703 | suppression coefficient memory |
| 706 | weight memory |
| 707 | multiplexed weighted adder |
| 708, 5046, 7092, 7094 | adder |
| 811 | MMSE STSA gain functional value calculator |
| 812 | generalized likelihood ratio calculator |
| 814 | suppression coefficient calculator |
| 921 | instant estimated SNR |

-continued

| Description of Symbols | |
|---|---|
| $921_0$ to $921_{K-1}$ | frequency domain instant estimated SNR |
| 922 | past estimated SNR |
| $922_0$ to $922_{K-1}$ | past frequency domain estimated SNR |
| 923 | weight |
| 924 | estimated apriori SNR |
| $924_0$ to $924_{K-1}$ | frequency domain estimated apriori SNR |
| $1301_0$ to $1301_{K-1}$, 1597, 7091, 7093 | multiplier |
| 1401, 5042 | estimated noise memory |
| 1405 | multiplexed nonlinear processor |
| $1421_0$ to $1421_{K-1}$, 5048 | divider |
| $1485_0$ to $1485_{K-1}$ | nonlinear processor |
| $1501_0$ to $1501_{K-1}$ | frequency domain suppression coefficient corrector |
| 1591, $7012_0$ to $7012_{K-1}$ | maximum value selector |
| 1592 | suppression coefficient lower limit value memory |
| 1593, 5204, 5206 | threshold memory |
| 1594, 5203, 5205 | comparator |
| 1595, 5044 | switch |
| 1596 | corrected value memory |
| $1802_0$ to $1802_{K-1}$ | weighting processor |
| $1902_0$ to $1902_{K-1}$ | phase rotator |
| 5041 | register length memory |
| 5045 | shift register |
| 5047 | minimum value selector |
| 5201 | logical OR calculator |
| 5207 | threshold calculator |
| 7011 | constant memory |
| $7071_0$ to $7071_{K-1}$ | weighted adder |
| 7095 | constant multiplier |

BEST MODE FOR CARRYING OUT THE INVENTION

Figure 1:
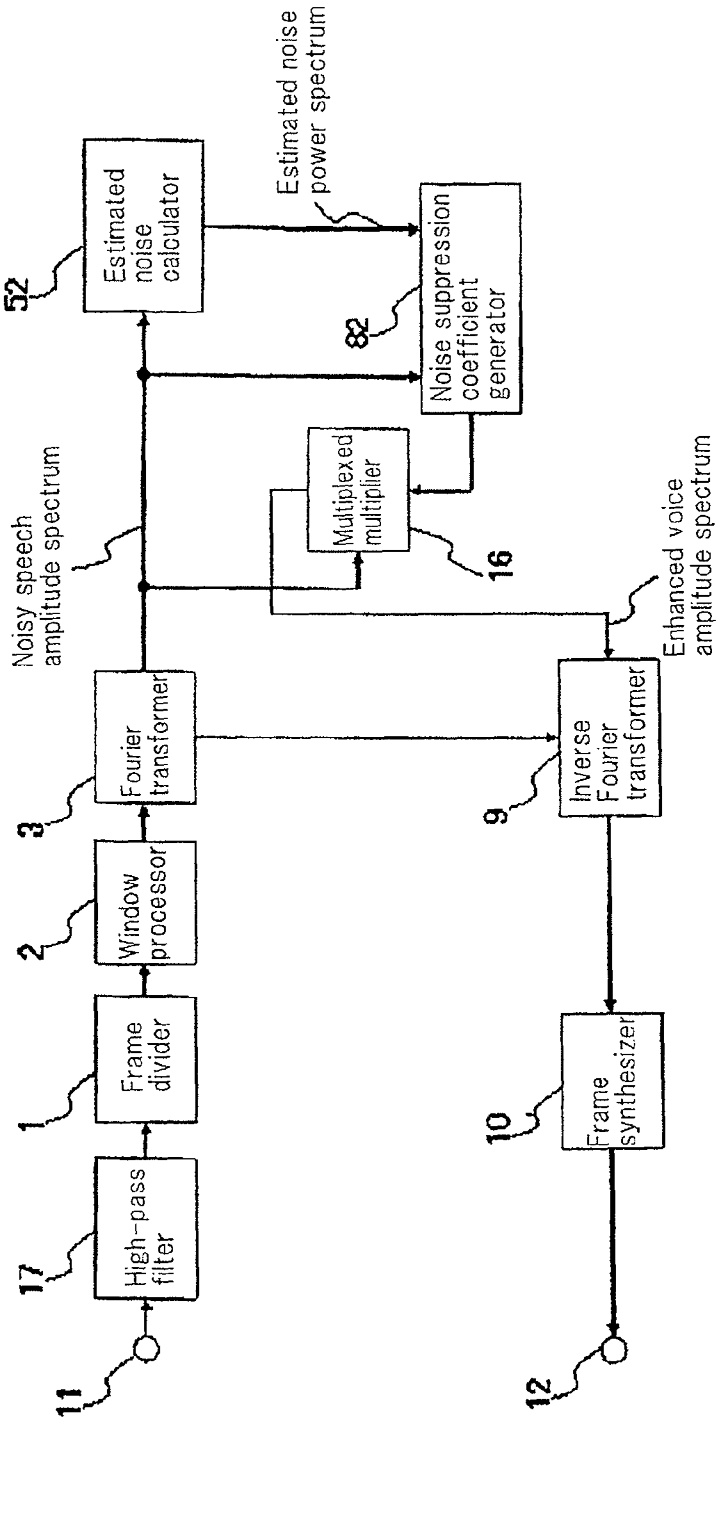
FIG. 1 is a block diagram illustrating a configuration example of a conventional noise suppressing apparatus.
Figure 2:
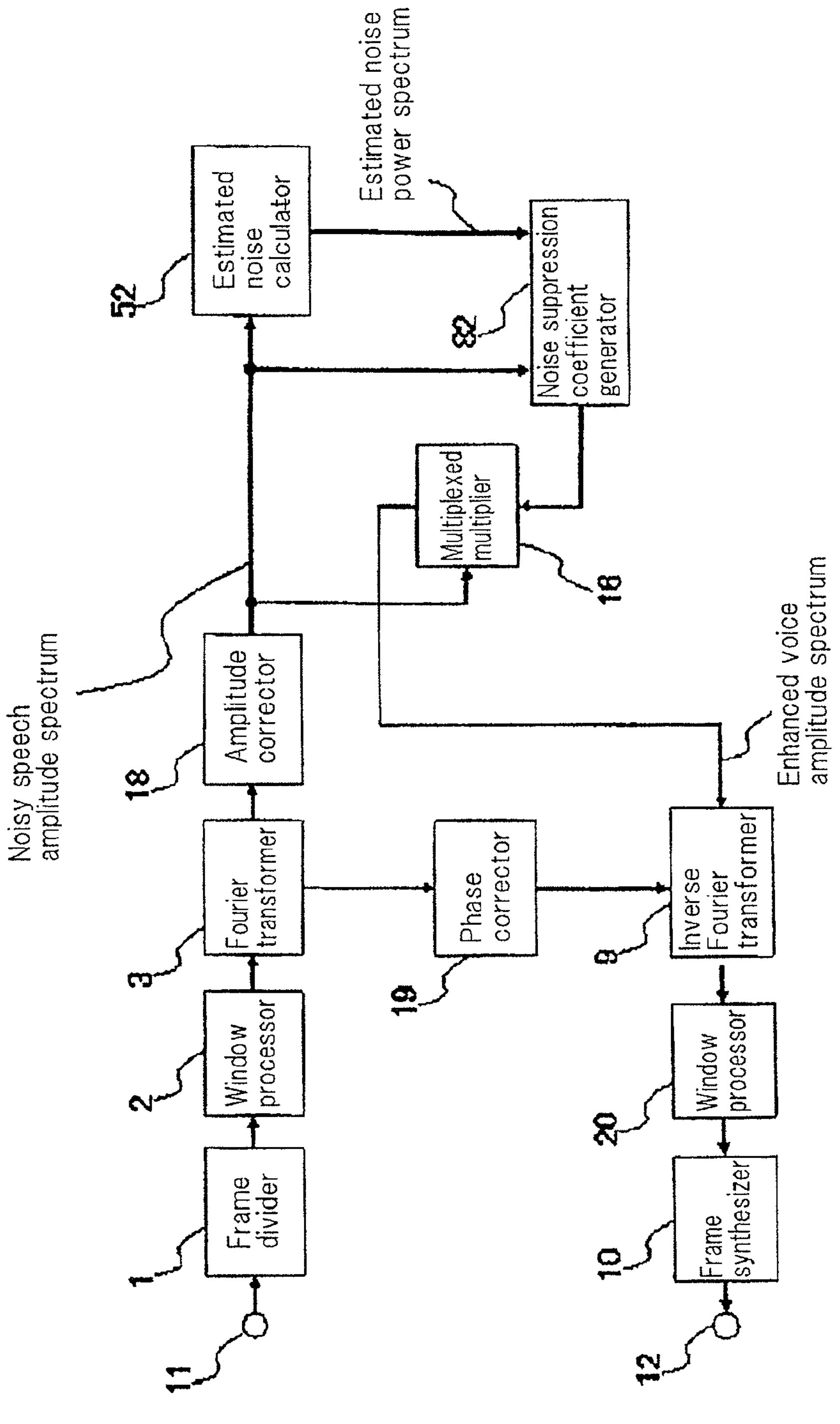
FIG. 2 is a block diagram illustrating a first exemplary embodiment of the present invention.

FIG. 2 is a block diagram illustrating a first exemplary embodiment of the present invention. The configuration of FIG. 2 and the configuration of FIG. 1, a conventional example, are the same as each other excluding high-pass filter 17, amplitude corrector 18, phase corrector 19, and window processor 20. Detailed operations will be described below as focusing on such different points.

In FIG. 2, high-pass filter 17 of FIG. 1 is deleted, and instead, amplitude corrector 18, phase corrector 19, and window processor 20 are provided. Amplitude corrector 18 and phase corrector 19 are provided to apply a frequency response of a high-pass filter to a signal converted to a frequency domain. An absolute value (amplitude frequency response) of a function of f, the function being obtained by applying $z=\exp(j\cdot 2\pi f)$ to a transfer function of high-pass filter 17, is applied to an input signal in amplitude corrector 18, and a phase (phase frequency response) is applied to the input signal in phase corrector 19.

With such operations, the same effect can be obtained as a case in which high-pass filter 17 is applied to the input signal. That is, instead of convolving the transfer function of high-pass filter 17 with the input signal in a time domain, after being converted to a frequency domain signal in Fourier transformer 3, the function is multiplied by a frequency response.

The output of amplitude corrector 18 is delivered to estimated noise calculator 52, noise suppression coefficient generator 82, and multiplexed multiplier 16. The output of phase corrector 19 is transferred to inverse Fourier transformer 9.

The following operations are the same as those described by using FIG. 1. As disclosed in Patent Document 3 (Japanese Patent Laid-Open No. 2003-131689), window processor 20 is provided to suppress intermittent sound in a frame boundary.

Figure 3:
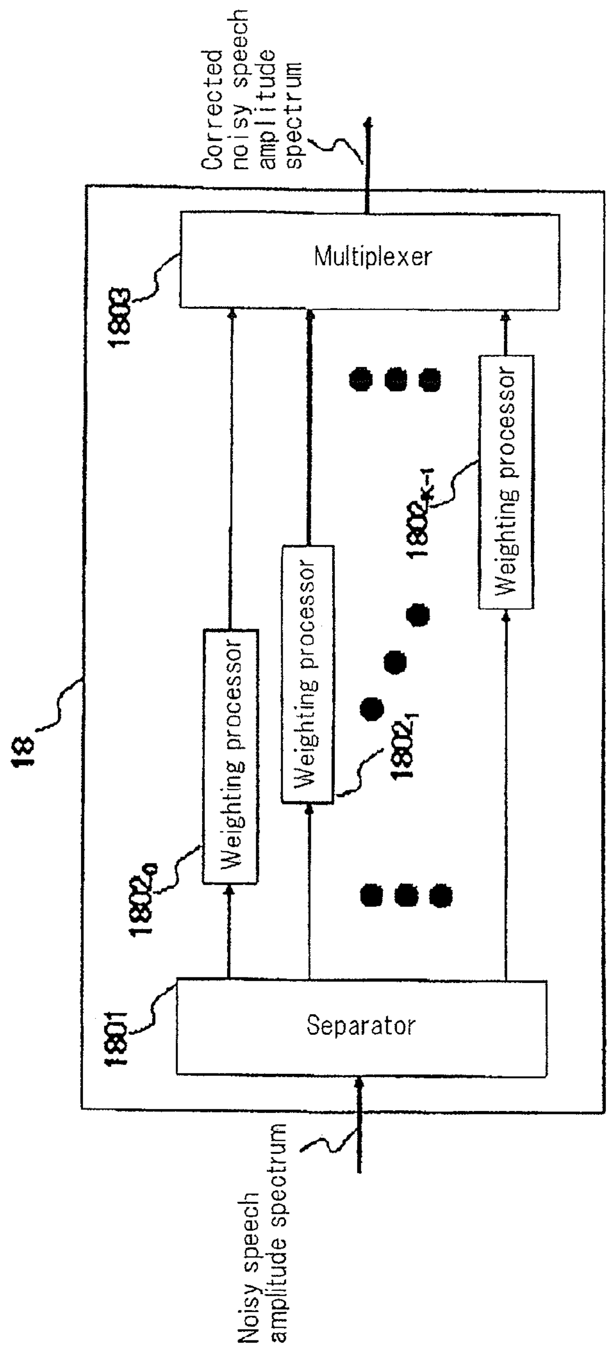
FIG. 3 is a block diagram illustrating a configuration of an amplitude corrector included in the first exemplary embodiment of the present invention.

FIG. 3 illustrates a configuration example of amplitude corrector 18. A multiplexed noisy speech amplitude spectrum delivered from Fourier transformer 3 is transferred to separator 1801. Separator 1801 breaks the multiplexed noisy speech amplitude spectrum into each frequency component to transfer the frequency component to weighting processors $\mathbf{1802}_0$ to $\mathbf{1802}_{K-1}$. Weighting processors $\mathbf{1802}_0$ to $\mathbf{1802}_{K-1}$ weights each of the noisy speech amplitude spectrum broken into each frequency component with a corresponding amplitude frequency response, and transfers the spectrum to multiplexer 1803. Multiplexer 1803 multiplex the signals transferred from weighting processors $\mathbf{1802}_0$ to $\mathbf{1802}_{K-1}$ to output the multiplexed signal as a corrected noisy speech amplitude spectrum.

Figure 4:
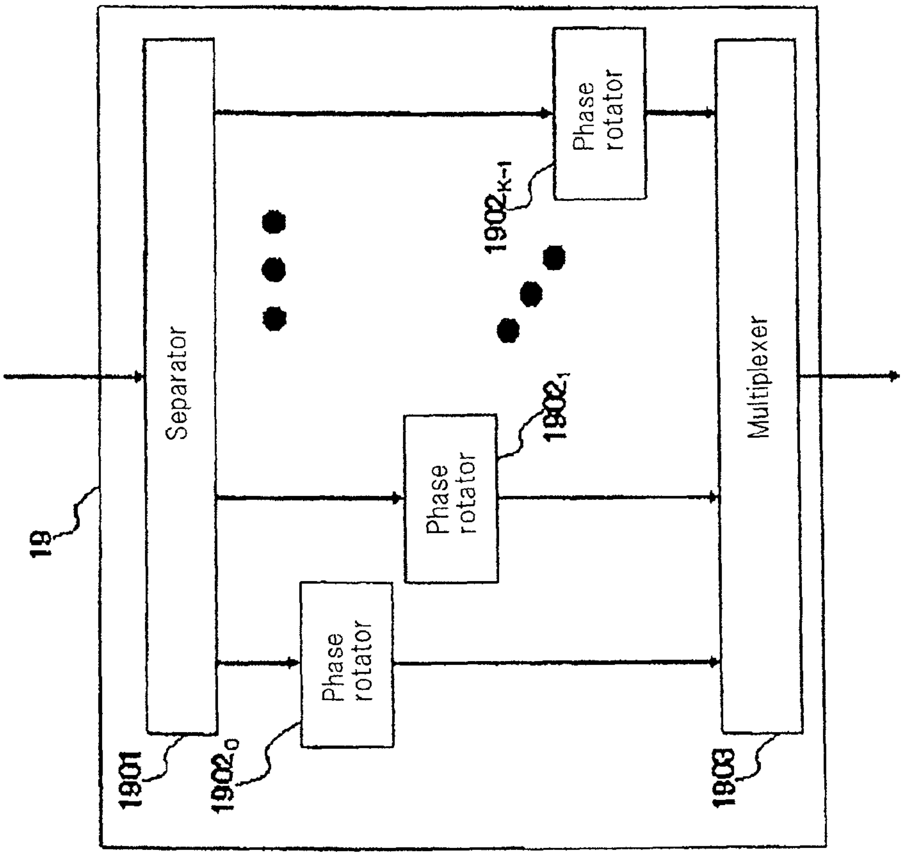
FIG. 4 is a block diagram illustrating a configuration of a voice existing probability calculator included in FIG. 3.

FIG. 4 illustrates a configuration example of phase corrector 19. A multiplexed noisy speech phase spectrum delivered from Fourier transformer 3 is transferred to separator 1901. Separator 1901 breaks the multiplexed noisy speech phase spectrum into each frequency component to transfer each frequency component to phase rotators $\mathbf{1902}_0$ to $\mathbf{1904}_{K-1}$. Each of phase rotators $\mathbf{1902}_0$ to $\mathbf{1902}_{K-1}$ rotates the noisy speech phase spectrum broken to each frequency component according to the corresponding phase frequency response to transfer the spectrum to multiplexer 1903. Multiplexer 1903 multiplexes the signals transferred from phase rotators $\mathbf{1902}_0$ to $\mathbf{1902}_{K-1}$, to output the multiplexed signal as a corrected noisy speech phase spectrum. The existence of phase corrector 19 is not as important as that of amplitude corrector 18, and can be omitted. This is because it is known that the existence of phase corrector 19 influences only the phase of the output signal, and phase information is much less important than amplitude information for understanding voice content.

Figure 5:
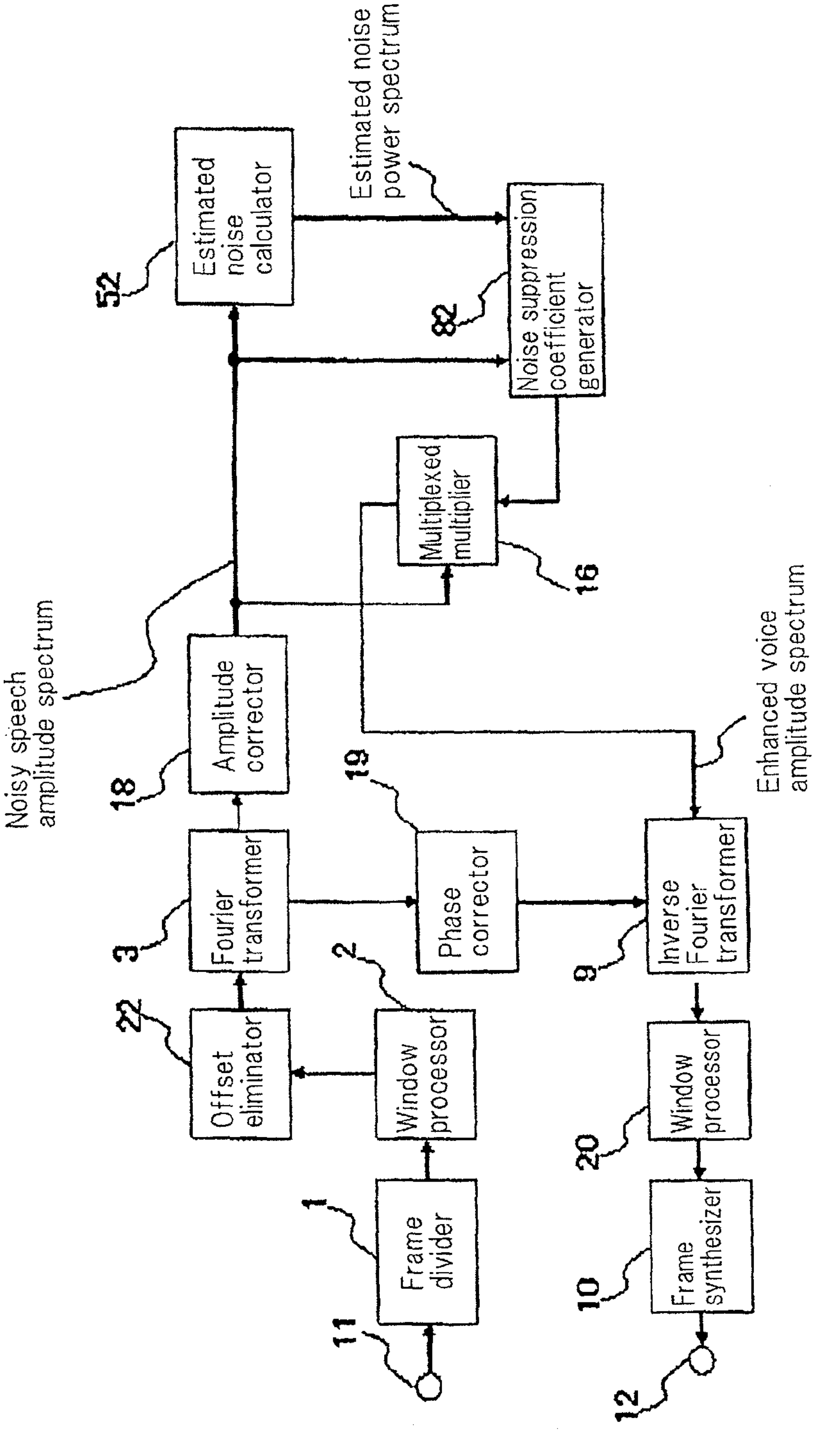
FIG. 5 is a block diagram illustrating a second exemplary embodiment of the present invention.

FIG. 5 is a block diagram illustrating a second exemplary embodiment of the present invention. The difference between the configuration of FIG. 5 and the configuration of FIG. 2 that is the first exemplary embodiment is offset eliminator 22. Offset eliminator 22 eliminates an offset of the window-processed noisy speech to output the voice. The simplest method for eliminating an offset is to obtain the average value of the noisy speech for each frame to designate the average value as an offset, and subtract this offset from all samples in the corresponding frame. Alternatively, the average values of each frame are averaged for a plurality of frames, and the obtained average value may be subtracted from the samples as an offset. By eliminating the offset, the conversion accuracy can be increased in Fourier transformer 3, and the sound quality of the enhanced voice to be outputted can be improved.

Figure 6:
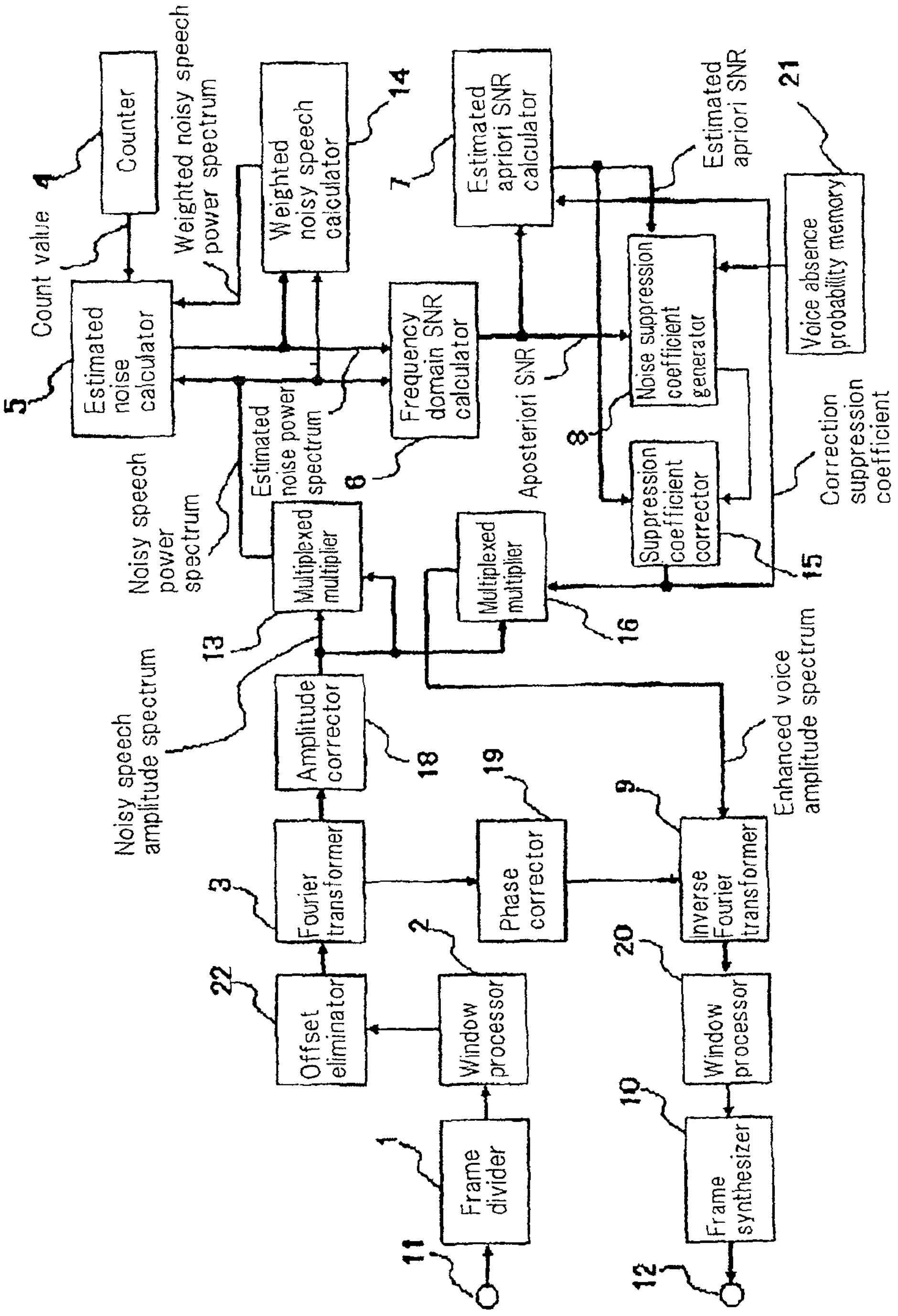
FIG. 6 is a block diagram illustrating a third exemplary embodiment of the present invention.

FIG. 6 is a block diagram illustrating a third exemplary embodiment of the present invention. The noisy speech signal (a signal in which a desired voice signal and a noise are mixed) is delivered to input terminal 11 as the sample value series. The noisy speech signal sample is delivered to frame divider 1 to be divided into frames for each K/2 samples. Here, it is assumed that K is an odd number. The noisy speech signal sample divided into the frames is delivered to window processor 2, and is multiplied by window function w(t). A signal $y_n(t)$ bar obtained by window-processing the input signal of the n-th frame, $y_n(t)$ ($t=0, 1, \ldots, K/2-1$), is expressed as the following equation.

[Equation 1]

$$\bar{y}_n(t)=w(t)y_n(t) \tag{1}$$

In addition, such an operation is also widely executed in which parts of two continuous frames are overlapped to be window-processed. If it is assumed that an overlapped length is 50% of a frame length, for t=0, 1, . . . , K/2−1,

[Equation 2]

$$\bar{y}_n(t)=w(t)y_{n-1}(t+K/2)$$

$$\bar{y}_n(t+K/2)=w(t+K/2)y_n(t) \quad (2)$$

The $y_n(t)$ bar (t=0, 1, . . . , K−1) obtained from the above equation becomes the output of window processor 2. A bilaterally-symmetric window function is used for a real number signal. The window function is designed so that the input signal and the output signal correspond to each other as excluding a calculation error when the suppression coefficient is set to "1". This means w(t)+w(t+K/2)=1.

Hereinafter, such a case will be continued to be described as an example in which 50% of two continuous frames are overlapped to be window-processed. For example, the Hanning window indicated by the following equation can be used as w(t).

[Equation 3]

$$w(t)=\begin{cases}0.5+0.5\cos\left(\frac{\pi(t-K/2)}{K/2}\right), & 0\le t<K\\ 0, & K\le t\end{cases} \quad (3)$$

Other than this equation, a variety of window functions such as the Hamming window, the Kayser window, and the Blackman window are known. The window-processed output yn(t) bar is delivered to offset eliminator 22, and the offset is eliminated. The details for eliminating the offset are the same as that described by using FIG. 5.

The signal whose offset has been eliminated is delivered to Fourier transformer 3, and is converted to a noisy speech spectrum $Y_n(k)$. The noisy speech spectrum $Y_n(k)$ is separated into a phase and an amplitude, a noisy speech phase spectrum arg $Y_n(k)$ is delivered to inverse Fourier transformer 9 through phase corrector 19, and a noisy speech amplitude spectrum $|Y_n(k)|$ is delivered to multiplexed multiplier 13 and multiplexed multiplier 16 through amplitude corrector 18. Operations of phase corrector 19 and amplitude corrector 18 are the same as that described by using FIG. 2.

Multiplexed multiplier 13 calculates a noisy speech power spectrum by using the noisy speech amplitude spectrum whose amplitude is corrected to transfer the spectrum to estimated noise calculator 5, frequency domain SNR (Signal-to-Noise Ratio) calculator 6, and weighted noisy speech calculator 14. Weighted noisy speech calculator 14 calculates a weighted noisy speech power spectrum by using the noisy speech power spectrum delivered from multiplexed multiplier 13 to transfer the spectrum to estimated noise calculator 5.

Estimated noise calculator 5 estimates the power spectrum of a noise by using the noisy speech power spectrum, the weighted noisy speech power spectrum, and a count value delivered from counter 4, and transfers the power spectrum to frequency domain SNR calculator 6 as an estimated noise power spectrum. Frequency domain SNR calculator 6 calculates SNR for each frequency by using the input noisy speech power spectrum and the input estimated noise power spectrum, and delivers the SNR to estimated apriori SNR calculator 7 and noise suppression coefficient generator 8 as an aposteriori SNR.

Estimated apriori SNR calculator 7 estimates an apriori SNR by using the input aposteriori SNR, and a correction suppression coefficient delivered from suppression coefficient corrector 15, and transfers the apriori SNR to noise suppression coefficient generator 8 as an estimated apriori SNR. Noise suppression coefficient generator 8 generates a noise suppression coefficient by using the aposteriori SNR and the estimated apriori SNR which are delivered as inputs, and by using a voice absence probability delivered from voice absence probability memory 21, and transfers the noise suppression coefficient to suppression coefficient corrector 15 as a suppression coefficient. Suppression coefficient corrector 15 corrects the suppression coefficient by using the input estimated apriori SNR and suppression coefficient, and delivers the corrected suppression coefficient to multiplexed multiplier 16 as a corrected suppression coefficient $G_n(k)$ bar. Multiplexed multiplier 16 obtains an enhanced voice amplitude spectrum $|X_n(k)|$ bar by weighting the corrected noisy speech amplitude spectrum delivered from Fourier transformer 3 through amplitude corrector 18 with the corrected suppression coefficient $G_n(k)$ bar delivered from suppression coefficient corrector 15, and transfers the enhanced voice amplitude spectrum to inverse Fourier transformer 9.

$|X_n(k)|$ bar is expressed as the following equation.

[Equation 4]

$$|\bar{X}_n(k)|=\bar{G}_n(k)H_n(k)|Y_n(k)| \quad (4)$$

Here, $H_n(k)$ is a correction gain in amplitude corrector 18, and is obtained as an amplitude frequency response of the high-pass filter of FIG. 1.

Inverse Fourier transformer 9 obtains the enhanced voice $X_n(k)$ bar by multiplying the enhanced voice amplitude spectrum $|X_n(k)|$ bar delivered from multiplexed multiplier 16 by the corrected noisy speech phase spectrum arg $Y_n(k)$+arg $H_n(k)$ delivered from Fourier transformer 3 through phase corrector 19. That is,

[Equation 5]

$$\bar{X}_n(k)=|\bar{X}_n(k)|\cdot\{\arg Y_n(k)+\arg H_n(k)\} \quad (5)$$

is executed. Here, arg $H_n(k)$ is a corrected phase in phase corrector 19, and is obtained as a phase frequency response of the high-pass filter of FIG. 1.

Inverse Fourier transformer 9 inverse-Fourier-transforms the obtained enhanced voice $X_n(k)$ bar, and delivers the enhanced voice $X_n(k)$ bar to window processor 20 as a time domain sample series $x_n(t)$ bar (t=0, 1, . . . , K−1) whose frame is configured with K samples. Window processor 20 multiplies the time domain sample series $x_n(t)$ bar delivered from inverse Fourier transformer 9 by the window function w(t). The signal $x_n(t)$ bar is expressed as the following equation, the signal $x_n(t)$ bar being obtained by window-processing the input signal $x_n(t)$ (t=0, 1, . . . , K/2−1) of the n-th frame with w(t).

[Equation 6]

$$\bar{x}_n(t)=w(t)x_n(t) \quad (6)$$

In addition, such an operation is also widely executed in which parts of two continuous frames are overlapped to be window-processed. If it is assumed that an overlapped length is 50% of a frame length, for t=0, 1, . . . , K/2−1,

[Equation 7]

$$\bar{x}_n(t)=w(t)x_{n-1}(t-K/2)$$

$$\bar{x}_n(t+K/2)=w(t+K/2)x_n(t) \quad (7)$$

the $x_n(t)$ bar (t=0, 1, . . . , K−1) obtained from the above equation becomes an output of window processor 20, and is transferred to frame synthesizer 10.

Frame synthesizer 10 takes each K/2 sample from two adjacent frames of $x_n(t)$ bar to overlap the samples,

[Equation 8]

$$\hat{x}_n(t)=\bar{x}_{n-1}(t+K/2)\bar{x}_n(t) \tag{8}$$

and obtains an enhanced voice $x_n(t)$ hat by using the above equation. The obtained enhanced voice $x_n(t)$ hat (t=0, 1, . . . , K−1) is transferred to output terminal 12 as an output of frame synthesizer 10.

Figure 7:
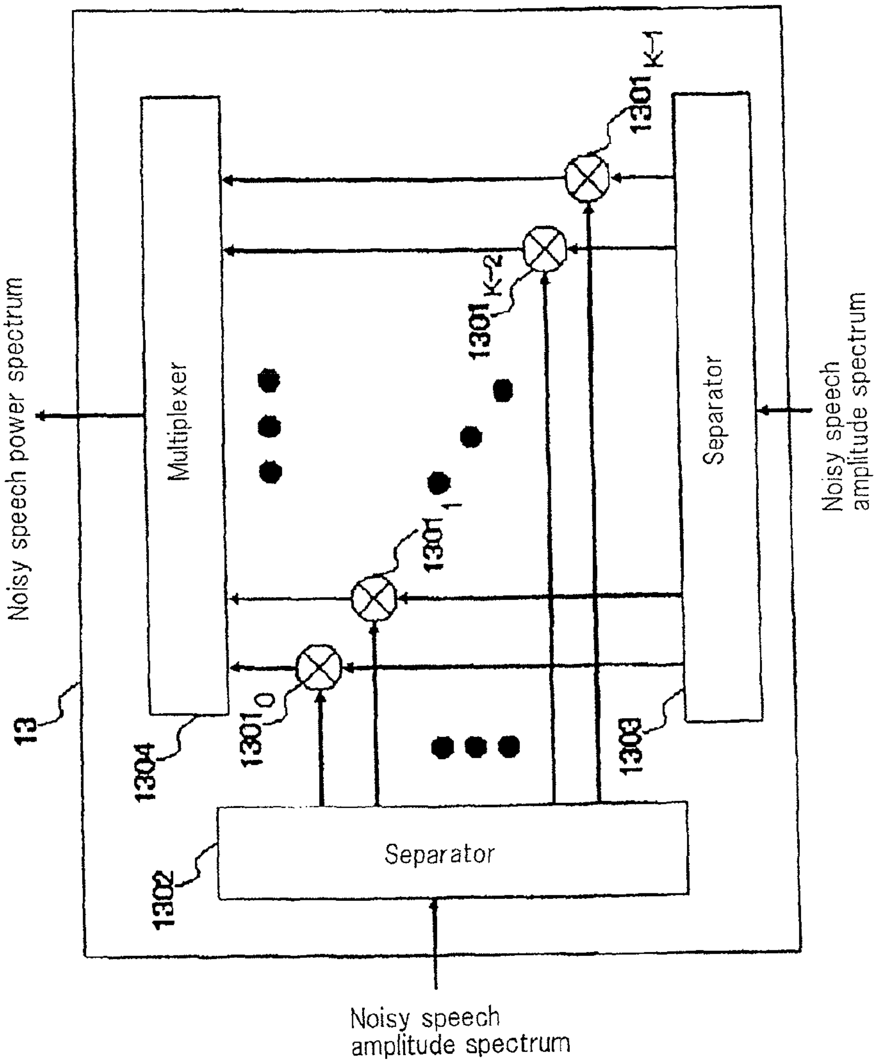
FIG. 7 is a block diagram illustrating a configuration of a multiplexed multiplier included in the third exemplary embodiment of the present invention.

FIG. 7 is a block diagram illustrating a configuration of multiplexed multiplier 13 illustrated in FIG. 6. Multiplexed multiplier 13 includes multiplier $\mathbf{1301}_0$ to $\mathbf{1301}_{K-1}$, separators 1302 and 1303, and multiplexer 1304. The corrected noisy speech amplitude spectrum, which is delivered from amplitude corrector 18 of FIG. 6 as being multiplexed, is separated into K samples of each frequency in separators 1302 and 1303, and is delivered to multipliers $\mathbf{1301}_0$ to $\mathbf{1301}_{K-1}$ respectively. Multipliers $\mathbf{1301}_0$ to $\mathbf{1301}_{K-1}$ square the input signals respectively to transfer the squared signals to multiplexer 1304 respectively. Multiplexer 1304 multiplexes the input signals to output the multiplexed signal as the noisy speech power spectrum.

Figure 8:
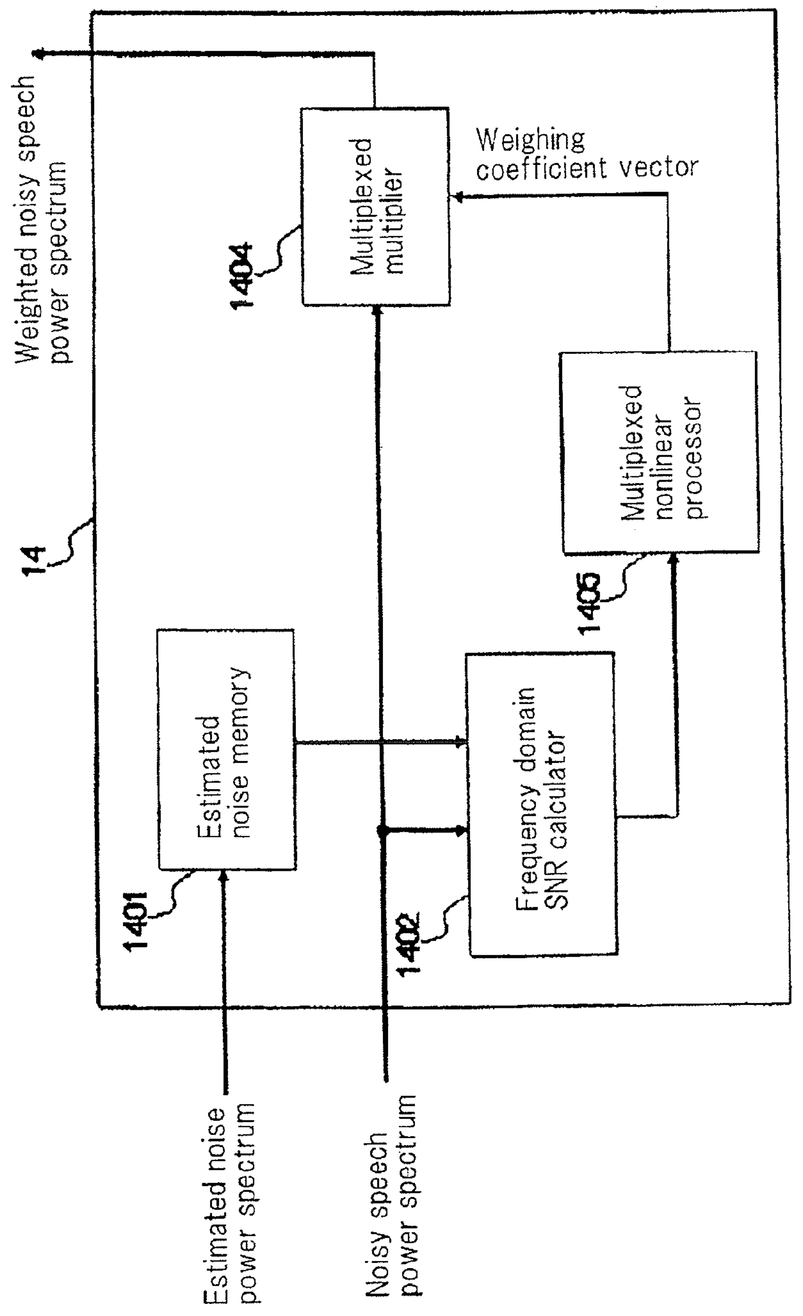
FIG. 8 is a block diagram illustrating a configuration of a weighted noisy speech calculator included in the third exemplary embodiment of the present invention.

FIG. 8 is a block diagram illustrating a configuration of weighted noisy speech calculator 14. Weighted noisy speech calculator 14 includes estimated noise memory 1401, frequency domain SNR calculator 1402, multiplexed nonlinear processor 1405, and multiplexed multiplier 1404. Estimated noise memory 1401 memorizes the estimated noise power spectrum delivered from estimated noise calculator 5 of FIG. 6, and outputs the estimated noise power spectrum in the previous frame to frequency domain SNR calculator 1402.

Frequency domain SNR calculator 1402 obtains the SNR for each frequency by using the estimated noise power spectrum delivered from estimated noise memory 1401 and the noisy speech power spectrum delivered from multiplexed multiplier 13 of FIG. 6, and outputs the SNR to multiplexed nonlinear processor 1405. Multiplexed nonlinear processor 1405 calculates a weight coefficient vector by using the SNR delivered from frequency domain SNR calculator 1402, and outputs the weight coefficient vector to multiplexed multiplier 1404.

Multiplexed multiplier 1404 calculates, for each frequency, the product of the noisy speech power spectrum delivered from multiplexed multiplier 13 of FIG. 6, and the weight coefficient vector delivered from multiplexed nonlinear processor 1405, and outputs the weighted noisy speech power spectrum to estimated noise calculator 5 of FIG. 6. A configuration of multiplexed multiplier 1404 is the same as that of multiplexed multiplier 13 described by using FIG. 7, so that a detailed description will be omitted.

Figure 9:
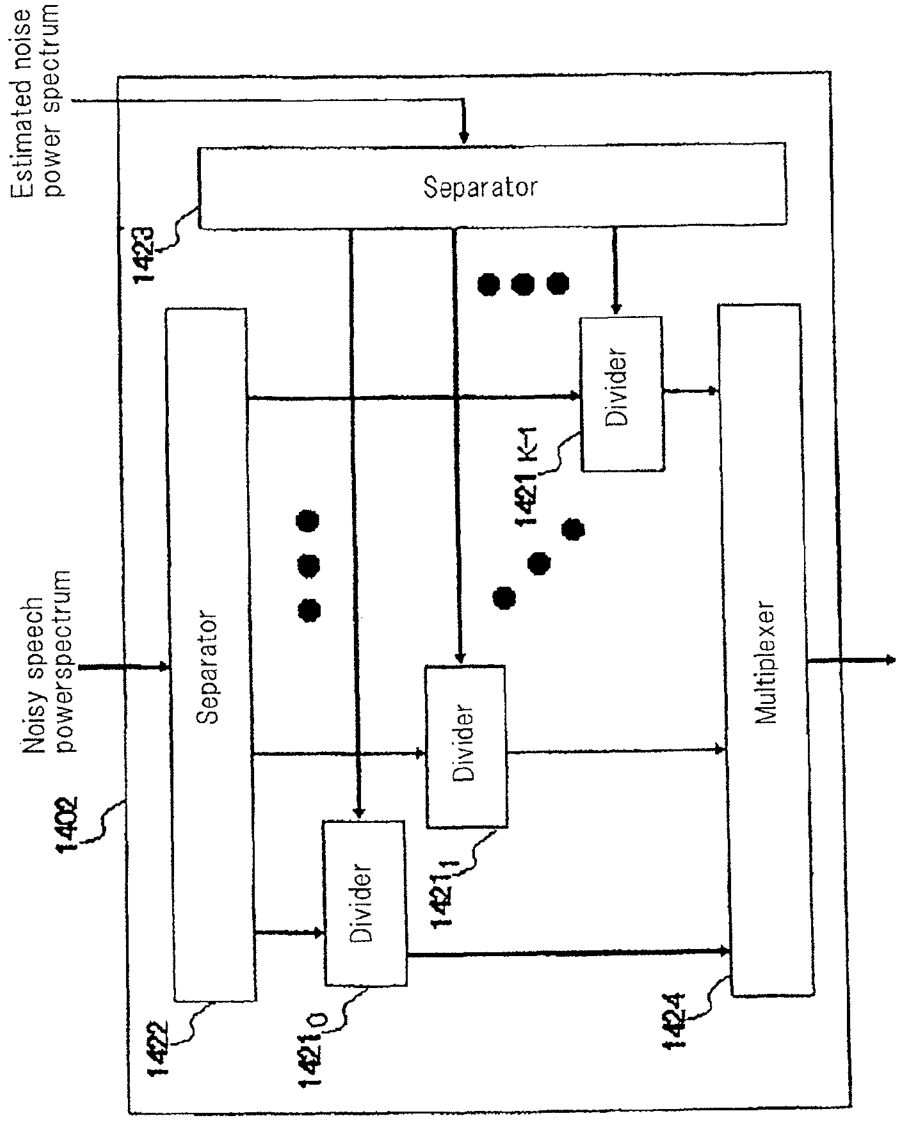
FIG. 9 is a block diagram illustrating a configuration of a frequency domain SNR calculator included in FIG. 8.

FIG. 9 is a block diagram illustrating a configuration of frequency domain SNR calculator 1402 included in FIG. 8. Frequency domain SNR calculator 1402 includes dividers $\mathbf{1421}_0$ to $\mathbf{1421}_{K-1}$, separators 1422 and 1423, and multiplexer 1424. The noisy speech power spectrum delivered from multiplexed multiplier 13 of FIG. 6 is transferred to separator 1422. The estimated noise power spectrum delivered from estimated noise memory 1401 of FIG. 8 is transferred to separator 1423. The noisy speech power spectrum and the estimated noise power spectrum are separated into K samples corresponding to frequency components in separators 1422 and 1423 respectively, and are delivered to dividers $\mathbf{1421}_0$ to $\mathbf{1421}_{K-1}$ respectively.

In dividers $\mathbf{1421}_0$ to $\mathbf{1421}_{K-1}$, depending on the following equation, a frequency domain SNR $\gamma_n(k)$ hat is obtained by dividing the delivered noisy speech power spectrum with the estimated noise power spectrum, and is transferred to multiplexer 1424.

[Equation 9]

$$\hat{\gamma}_n(k) = \frac{|Y_n(k)|^2}{\lambda_{n-1}(k)} \tag{9}$$

Here, $\lambda_{n-1}(k)$ is the estimated noise power spectrum in the previous frame. Multiplexer 1424 multiplexes K pieces of transferred frequency domain SNRs, and transfers the multiplexed SNR to multiplexed nonlinear processor 1405 of FIG. 8.

Figure 10:
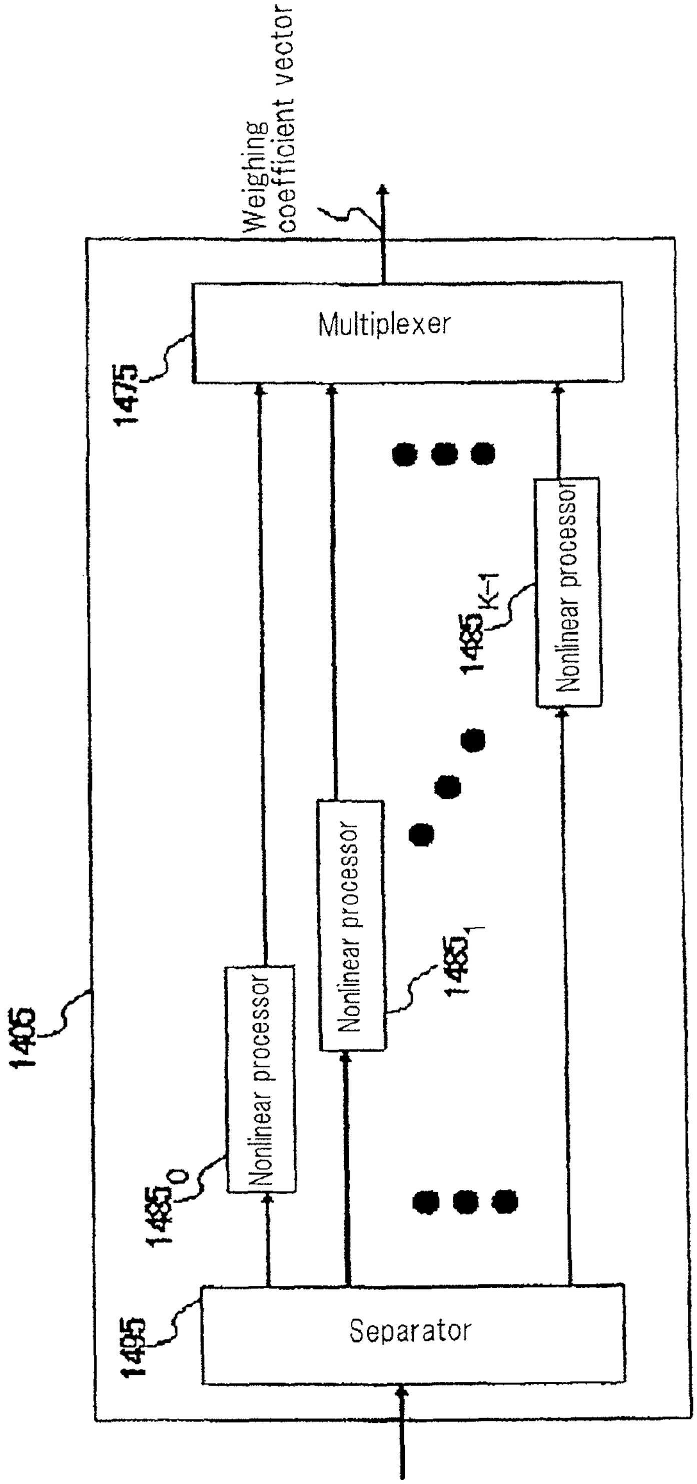
FIG. 10 is a block diagram illustrating a configuration of a multiplexed nonlinear processor included in FIG. 8.

Next, referring to FIG. 10, a configuration and an operation of multiplexed nonlinear processor 1405 of FIG. 8 will be described in detail. FIG. 10 is a block diagram illustrating a configuration of multiplexed nonlinear processor 1405 included in weighted noisy speech calculator 14. Multiplexed nonlinear processor 1405 includes separator 1495, nonlinear processors $\mathbf{1485}_0$ to $\mathbf{1485}_{K-1}$, and multiplexer 1475. Separator 1495 separates the SNR delivered from frequency domain SNR calculator 1402 of FIG. 8 to frequency domain SNRs, and outputs the separated SNRs to nonlinear processors $\mathbf{1485}_0$ to $\mathbf{1485}_{K-1}$. Nonlinear processors $\mathbf{1485}_0$ to $\mathbf{1485}_{K-1}$ include nonlinear functions for outputting a real number value according to the input values respectively.

Figure 11:
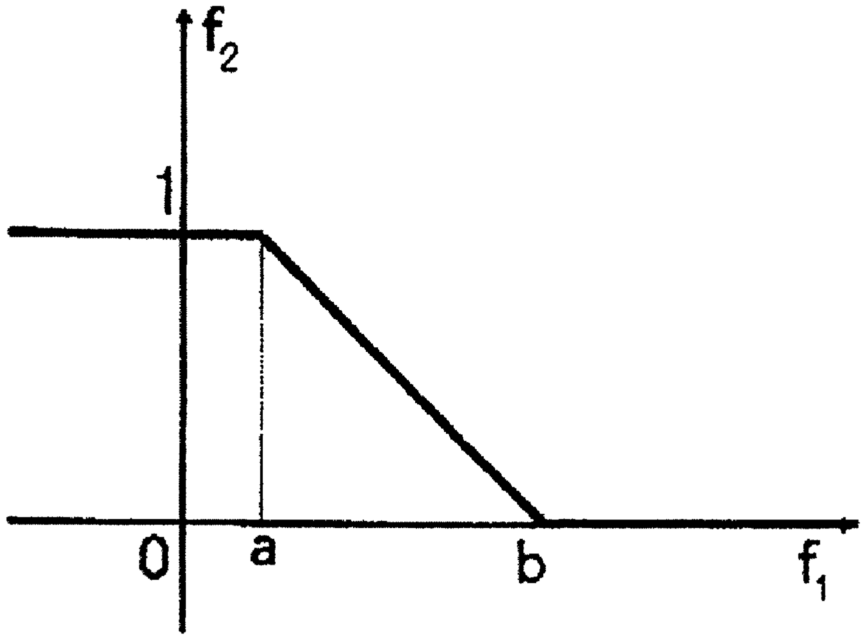
FIG. 11 is a diagram illustrating an example of a nonlinear function of the nonlinear processor.

FIG. 11 illustrates an example of the non-linear function. If f1 is the input value, an output value f2 of the nonlinear function illustrated in FIG. 11 is obtained by the following equation.

[Equation 10]

$$f_2 = \begin{cases} 1, & f_1 \le a \\ \dfrac{f_1 - b}{a - b}, & a < f_1 \le b \\ 0, & b < f_1 \end{cases} \tag{10}$$

Here, a and b are arbitrary real numbers.

Returning to FIG. 10, nonlinear processors $\mathbf{1485}_0$ to $\mathbf{1485}_{K-1}$ processes the frequency domain SNRs delivered from separator 1495 with the nonlinear function to obtain weighting coefficients, and outputs the weighting coefficients to multiplexer 1475. That is, nonlinear processors $\mathbf{1485}_0$ to $\mathbf{1485}_{K-1}$ output the weighting coefficients of "1" to "0" according to the SNRs. When the SNR is small, "1" is outputted, and when the SNR is large, "0" is outputted. Multiplexer 1475 multiplexes the weighting coefficients outputted from nonlinear processors $\mathbf{1485}_0$ to $\mathbf{1485}_{K-1}$, and outputs the multiplexed weighting coefficient to multiplexed multiplier 1404 as the weighting coefficient vector.

The weighting coefficient, which is multiplied by the noisy speech power spectrum in multiplexed multiplier 1404 of FIG. 8, is a value corresponding to the SNR, and as the SNR is larger, that is, a voice component included in the noisy speech is larger, the value of the weighting coefficient becomes smaller. While the noisy speech power spectrum is generally used to update the estimated noise, by weighting the noisy speech power spectrum used for updating the estimated noise according to the SNR, the influence of the voice component included in the noisy speech power spectrum can be made smaller, and more accurate noise estimation can be executed. Meanwhile, while such an example is illustrated in which the nonlinear function is used to calculate the weighting coefficient, it is also possible to use a function of the SNR, the function being expressed as another equation, such as a linear function and a high-order polynomial, other than the nonlinear function.

Figure 12:
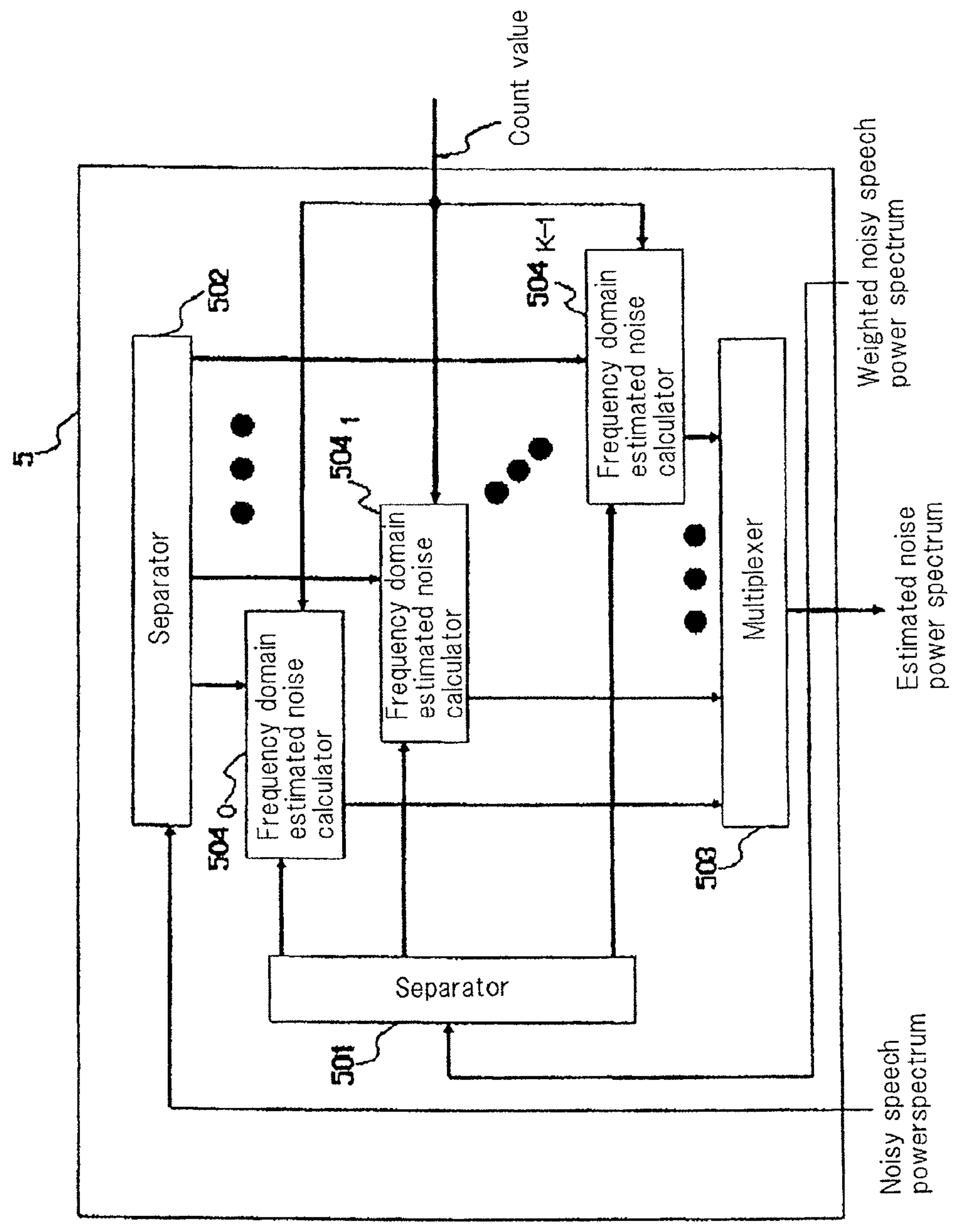
FIG. 12 is a block diagram illustrating a configuration of an estimated noise calculator included in the third exemplary embodiment of the present invention.

FIG. 12 is a block diagram illustrating a configuration of estimated noise calculator 5 illustrated in FIG. 6. Estimated noise calculator 5 includes separators 501 and 502, multiplexer 503, and frequency domain estimated noise calculators 504$_0$ to 504$_{K-1}$.

In FIG. 12, separator 501 separates the weighted noisy speech power spectrum delivered from weighted noisy speech calculator 14 of FIG. 6 to the weighted noisy speech power spectra of each frequency, and delivers the spectra to frequency domain estimated noise calculators 504$_0$ to 504$_{K-1}$ respectively. Separator 502 separates the noisy speech power spectrum delivered from multiplexed multiplier 13 of FIG. 6 to the noisy speech power spectra of each frequency, and outputs the spectra to frequency domain estimated noise calculators 504$_0$ to 504$_{K-1}$ respectively.

Frequency domain estimated noise calculators 504$_0$ to 504$_{K-1}$ calculate the frequency domain estimated noise power spectra from the frequency domain weighted noisy speech power spectra delivered from separator 501, the frequency domain noisy speech power spectra delivered from separator 502, and the count value delivered from counter 4 of FIG. 6, and output such power spectra to multiplexer 503. Multiplexer 503 multiplexes the frequency domain estimated noise power spectra delivered from frequency domain estimated noise calculators 504$_0$ to 504$_{K-1}$, and outputs the estimated noise power spectrum to frequency domain SNR calculator 6 of FIG. 6 and weighted noisy speech calculator 14. A configuration and an operation of frequency domain estimated noise calculators 504$_0$ to 504$_{K-1}$ will be described in detail by referring to FIG. 13.

Figure 13:
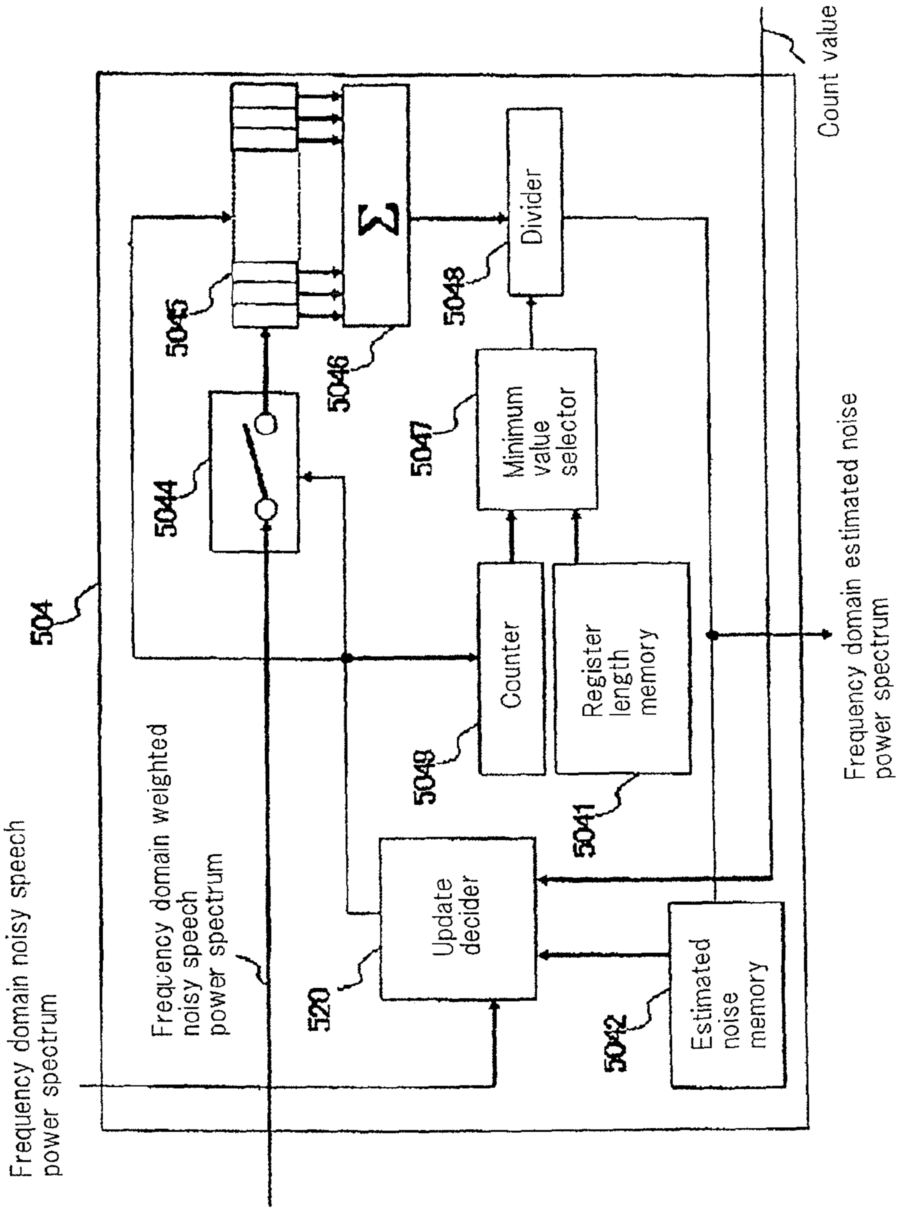
FIG. 13 is a block diagram illustrating a configuration of a frequency domain estimated noise calculator included in FIG. 12.

FIG. 13 is a block diagram illustrating the configuration of frequency domain estimated noise calculators 504$_0$ to 504$_{K-1}$ illustrated in FIG. 12. Frequency domain estimated noise calculators 504 includes update decider 520, register length memory 5041, estimated noise memory 5042, switch 5044, shift register 5045, adder 5046, minimum value selector 5047, divider 5048, and counter 5049.

The frequency domain weighted noisy speech power spectrum is delivered from separator 501 of FIG. 12 to switch 5044. When switch 5044 closes a circuit, the frequency domain weighted noisy speech power spectrum is transferred to shift register 5045. Shift register 5045 shifts memorized values of the internal register to the adjacent register in response to a control signal delivered from update decider 520. A register length is the same as a value memorized in register length memory 5041 which will be explained later. All register outputs of shift register 5045 are delivered to adder 5046. Adder 5046 adds all delivered register outputs to transfer the addition result to divider 5048.

On the other hand, update decider 520 is delivered with the count value, the frequency domain noisy speech power spectrum, and the frequency domain estimated noise power spectrum. Update decider 520 always outputs “1” until the count value reaches a predetermined value, outputs “1” when it is decided that the input noisy speech signal is a noise after the count value reaches the predetermined value, and outputs “0” in other cases. An output of update decider 520 is transferred to counter 5049, switch 5044, and shift register 5045.

Switch 5044 closes the circuit when the signal delivered from update decider 520 is “1”, and opens the circuit when the signal is “0”. Counter 5049 increases the count value when the signal delivered from update decider 520 is “1”, and does not change the count value when the signal is “0”. Shift register 5045 inputs one sample of the signal samples delivered from switch 5044 when the signal delivered from update decider 520 is “1”, and at the same time, shifts the memorized values of the internal register to the adjacent register. Minimum value selector 5047 is delivered with an output of counter 5049 and an output of register length memory 5041.

Minimum value selector 5047 selects the delivered count value or register length, whichever is smaller, and transfers the selected one to divider 5048. Divider 5048 divides an added value of the frequency domain noisy speech power spectra delivered from adder 5046 by the count value or the register length, whichever is smaller, and outputs the quotient as the frequency domain estimated noise power spectrum λn(k). If $B_n(k)$ (n=0, 1, . . . , N−1) is a sample value of the noisy speech power spectra stored in shift register 5045, $\lambda_n(k)$ is obtained by the following equation.

[Equation 11]

$$\lambda_n(k) = \frac{1}{N}\sum_{n=0}^{N-1} B_n(k) \tag{11}$$

In the above equation, N is the count value or the register length, whichever is smaller. Since the count value monotonically increases as starting from “0”, the dividing operation is first executed by using the count value, and later, is executed by using the register length. It is necessary to obtain an average value of values stored in shift register for division by the register length. First, since many values are not sufficiently memorized in shift register 5045, the dividing operation is executed by using the numbers of registers in which values are actually memorized. The number of registers in which values are actually memorized is equal to the count value when the count value is smaller than the register length, and becomes equal to the register length when the count value becomes larger than the register length.

Figure 14:
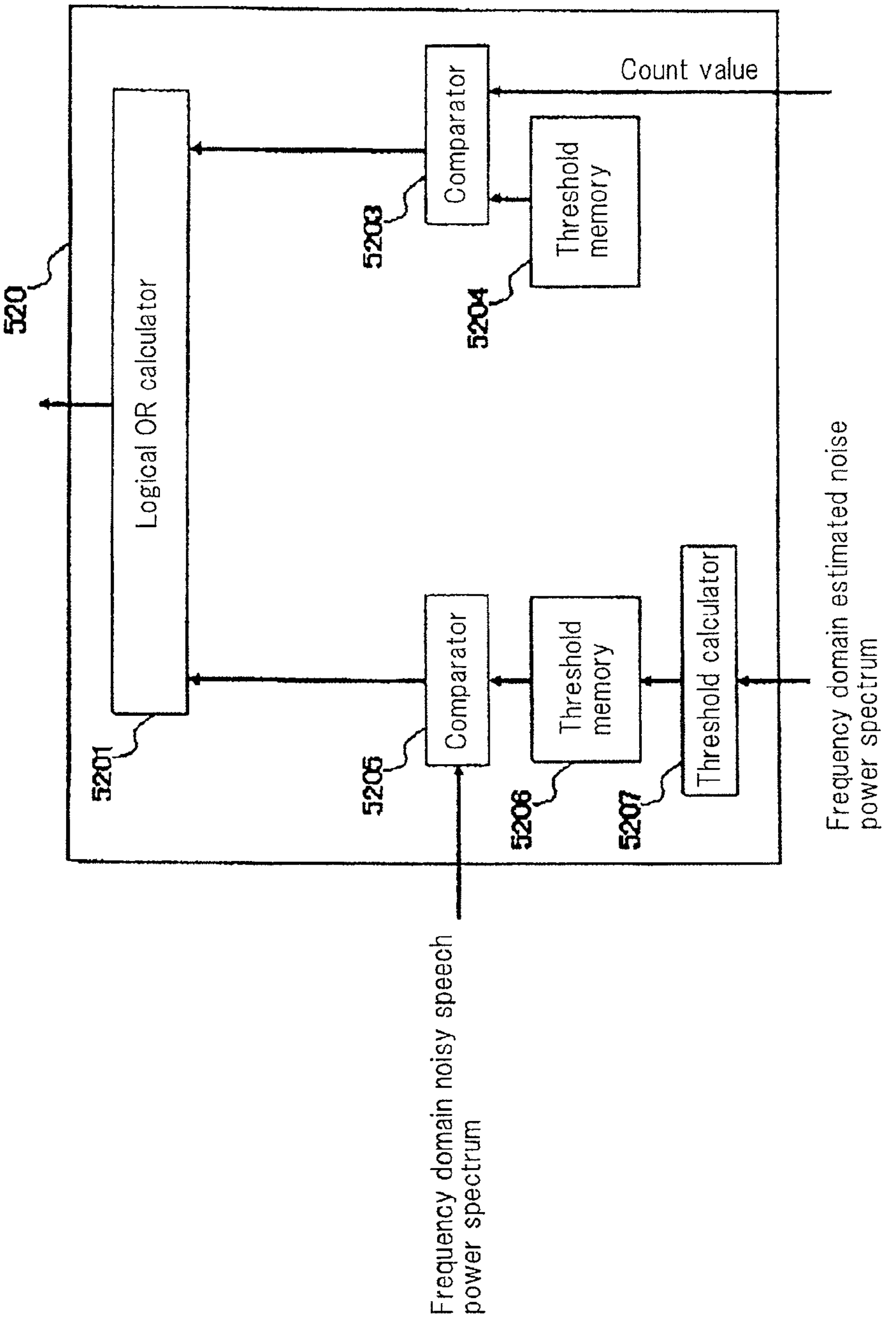
FIG. 14 is a block diagram illustrating a configuration of an update decider included in FIG. 13.

FIG. 14 is a block diagram illustrating a configuration of update decider 520 illustrated in FIG. 13. Update decider 520 includes logical OR calculator 5201, comparators 5203 and 5205, threshold memories 5204 and 5206, and threshold calculator 5207.

The count value delivered from counter 4 of FIG. 6 is transferred to comparator 5203. A threshold, an output of threshold memory 5204, is also transferred to comparator 5203. Comparator 5203 compares the delivered count value with the threshold, and transfers “1” to logical OR calculator 5201 when the count value is smaller than the threshold, and transfers “0” to logical OR calculator 5201 when the count value is larger than the threshold. On the other hand, threshold calculator 5207 calculates a value according to the frequency domain estimated noise power spectrum delivered from estimated noise memory 5042 of FIG. 13, and outputs the value to threshold memory 5206 as the threshold. The simplest method for calculating the threshold is to multiply the frequency domain estimated noise power spectrum by a constant. As another method, the threshold can be also calculated by using a high order polynomial and a nonlinear function.

Threshold memory 5206 memorizes the threshold outputted from threshold calculator 5207, and outputs the threshold which has been memorized one frame before to comparator 5205. Comparator 5205 compares the threshold delivered from threshold memory 5206 with the frequency domain noisy speech power spectrum delivered from separator 502 of FIG. 12, and outputs "1" to logical OR calculator 5201 when the frequency domain noisy speech power spectrum is smaller than the threshold, and outputs "0" to logical OR calculator 5201 when the frequency domain noisy speech power spectrum is larger than the threshold. That is, it is decided based on the magnitude of the estimated noise power spectrum whether or not the noisy speech signal is a noise. Logical OR calculator 5201 calculates a logical OR of an output value of comparator 5203 and an output value of comparator 5205, and outputs the calculation result to switch 5044, shift register 5045, and counter 5049 of FIG. 13.

As described above, not only in an initial status or a silent interval, but also when the noisy speech power is small in a non-silent interval, update decider 520 outputs "1". That is, the estimated noise is updated. Since the threshold is calculated for each frequency, the estimated noise can be updated for each frequency.

Figure 15:
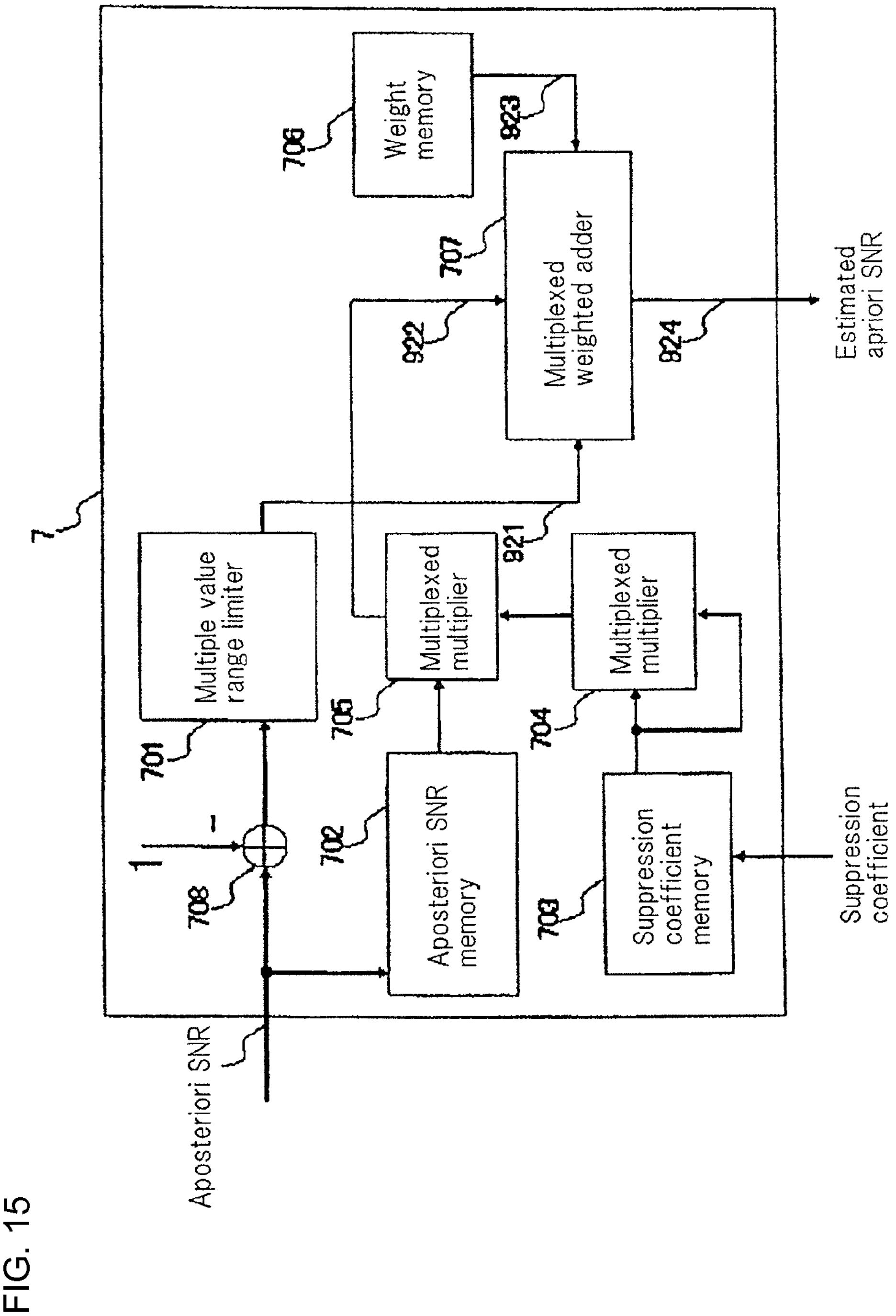
FIG. 15 is a block diagram illustrating a configuration of an estimated apriori SNR calculator included in the third exemplary embodiment of the present invention.

FIG. 15 is a block diagram illustrating a configuration of estimated apriori SNR calculator 7 illustrated in FIG. 6. Estimated apriori SNR calculator 7 includes multiple value range limiter 701, aposteriori SNR memory 702, suppression coefficient memory 703, multiplexed multipliers 704 and 705, weight memory 706, multiplexed weighted adder 707, and adder 708.

The aposteriori SNR $\gamma_n(k)$ (k=0, 1, . . . , K−1) delivered from frequency domain SNR calculator 6 of FIG. 6 is transferred to aposteriori SNR memory 702 and adder 708. Aposteriori SNR memory 702 memorizes the aposteriori SNR $\gamma_n(k)$ of the n-th frame, and transfers the aposteriori SNR $\gamma_{n-1}(k)$ of the (n−1)-th frame to multiplexed multiplier 705. The corrected suppression coefficient $G_n(k)$ bar (k=0, 1, . . . , K−1) delivered from suppression coefficient corrector 15 of FIG. 6 is transferred to suppression coefficient memory 703. Suppression coefficient memory 703 memorizes the corrected suppression coefficient $G_n(k)$ bar of the n-th frame, and transfers the corrected suppression coefficient $G_{n-1}(k)$ bar of the (n−1)-th frame to multiplexed multiplier 704.

Multiplexed multiplier 704 squares the delivered Gn(k) bar to obtain $G^2_{n-1}(k)$ bar, and transfers the $G^2_{n-1}(k)$ bar to multiplexed multiplier 705. Multiplexed multiplier 705 multiplies $G^2_{n-1}(k)$ bar with $\gamma_{n-1}(k)$ for k=0, 1, . . . , K−1 to obtain $G^2_{n-1}(k)$ bar $\gamma_{n-1}(k)$, and transfers the result to multiplexed weighted adder 707 as past estimated SNR 922. Since configurations of multiplexed multipliers 704 and 705 are equal to that of multiplexed multiplier 13 described by using FIG. 7, a detailed description will be omitted.

The other terminal of adder 708 is delivered with "−1", and the adding result $\gamma_n(k)-1$ is transferred to multiple value range limiter 701. Multiple value range limiter 701 applies an operation by a value range limiting operator P[·] to the adding result $\gamma_n(k)-1$ delivered from adder 708, and transfers the result, P $[\gamma_n(k)-1]$, to multiplexed weighted adder 707 as instant estimated SNR 921. P[x] is defined by the following equation.

[Equation 12]

$$P[x] = \begin{cases} x, & x > 0 \\ 0, & x \le 0 \end{cases} \tag{12}$$

Multiplexed weighted adder 707 is also delivered with weight 923 from weight memory 706. Multiplexed weighted adder 707 obtains estimated apriori SNR 924 by using such delivered instant estimated SNR 921, past estimated SNR 922, and weight 923. If it is assumed that weight 923 is α, $\xi_n(k)$ hat is the estimated apriori SNR, $\xi_n(k)$ hat can be calculated by following equation.

[Equation 13]

$$\hat{\xi}_n(k)=\alpha\gamma_{n-1}(k)\overline{G}_{n-1}{}^2(k)+(1-\alpha)P[\gamma_n(k)-1] \tag{13}$$

Here, it is assumed that $G^2_{-1}(k)\gamma_{-1}(k)$ bar=1.

Figure 16:
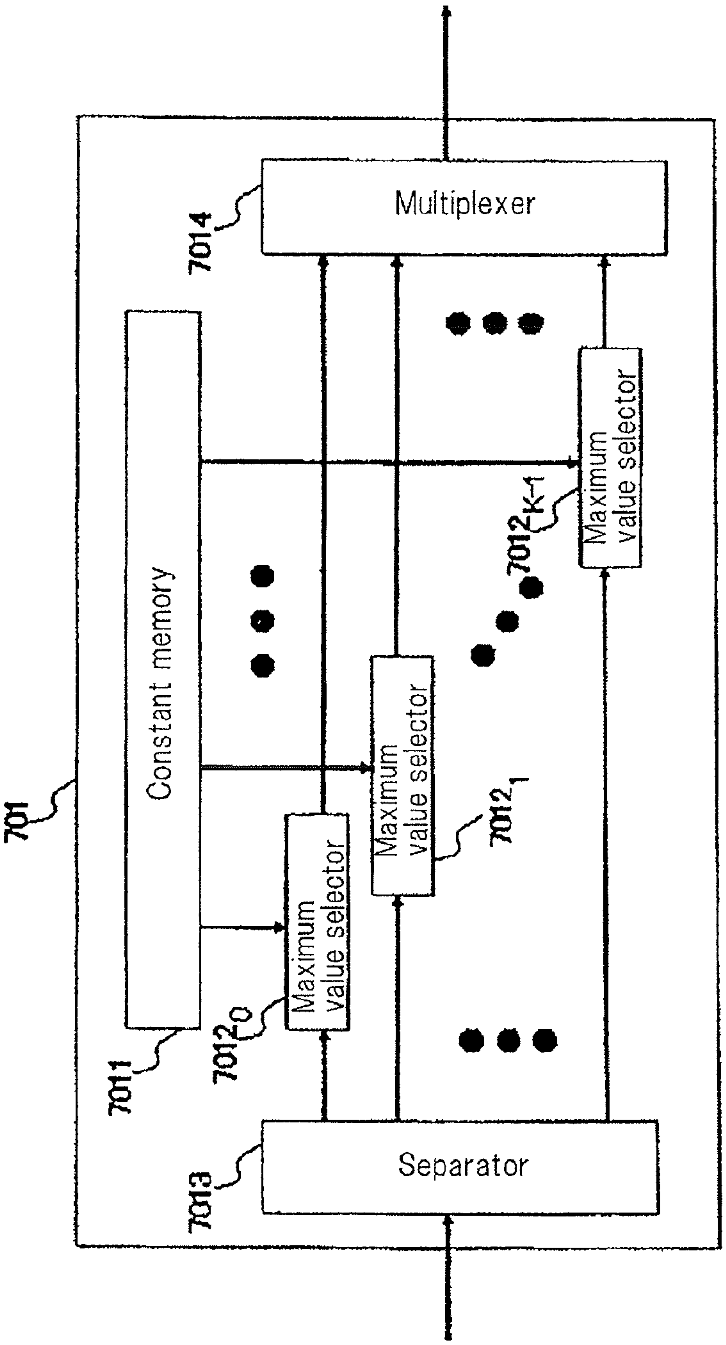
FIG. 16 is a block diagram illustrating a configuration of a multiple value range limiter included in FIG. 15.

FIG. 16 is a block diagram illustrating a configuration of multiple value range limiter 701 illustrated in FIG. 15. Multiple value range limiter 701 includes constant memory 7011, maximum value selectors $\mathbf{7012}_0$ to $\mathbf{7012}_{K-1}$, separator 7013, and multiplexer 7014. Separator 7013 is delivered with $\gamma_n(k)-1$ from adder 708 of FIG. 15. Separator 7013 separates the delivered $\gamma_n(k)-1$ to K pieces of frequency domain components, and delivers the frequency domain components to maximum value selectors $\mathbf{7012}_0$ to $\mathbf{7012}_{K-1}$. Other inputs of maximum value selectors $\mathbf{7012}_0$ to $\mathbf{7014}_{K-1}$ are delivered with "0" from constant memory 7011. Maximum value selectors $\mathbf{7012}_0$ to $\mathbf{7012}_{K-1}$ compare $\gamma_n(k)-1$ with "0" to transfer the larger value to multiplexer 7014. This maximum selection calculation corresponds to executing the above Equation 12. Multiplexer 7014 multiplexes and outputs such values.

Figure 17:
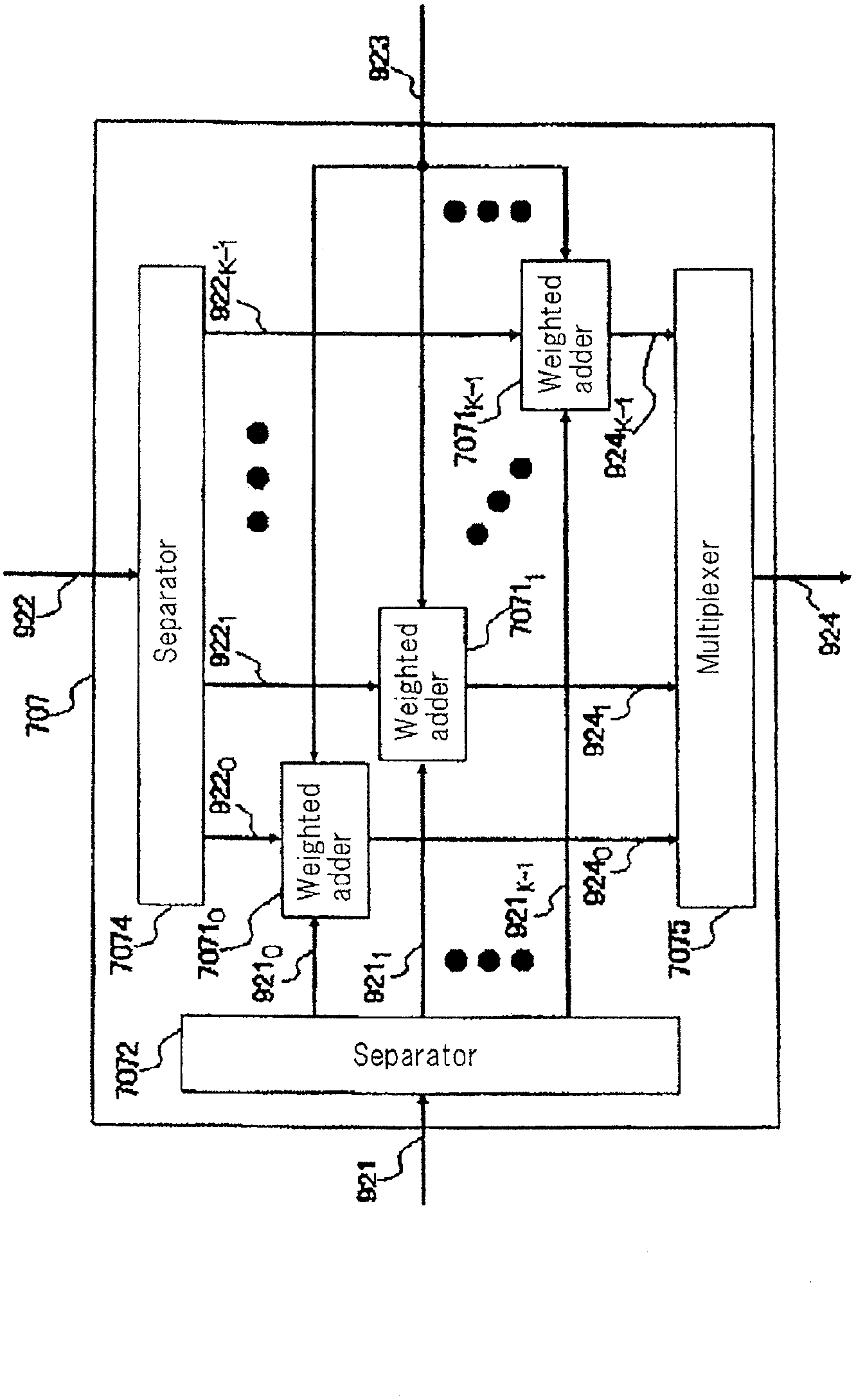
FIG. 17 is a block diagram illustrating a configuration of a multiplexed weighted adder included in FIG. 15.

FIG. 17 is a block diagram illustrating a configuration of multiplexed weighted adder 707 illustrated in FIG. 15. Multiplexed weighted adder 707 includes weighted adders $\mathbf{7071}_0$ to $\mathbf{7071}_{K-1}$, separators 7072 and 7074, and multiplexer 7075. Separator 7072 is delivered with P $[\gamma_n(k)-1]$ as instant estimated SNR 921 from multiple value range limiter 701 of FIG. 15. Separator 7072 separates P $[\gamma_n(k)-1]$ into K pieces of frequency domain components, and transfers the frequency domain components to weighted adders $\mathbf{7071}_0$ to $\mathbf{7071}_{K-1}$ as frequency domain instant estimated SNRs $\mathbf{921}_0$ to $\mathbf{921}_{K-1}$. Separator 7074 is delivered with $G^2_{n-1}(k)$ bar $\gamma_{n-1}(k)$ as past estimated SNR 922 from multiplexed multiplier 705 of FIG. 15.

Separator 7074 separates $G^2_{n-1}(k)$ bar $\gamma_{n-1}(k)$ into K pieces of frequency domain components, and transfers the frequency domain components to weighted adders $\mathbf{7071}_0$ to $\mathbf{7071}_{K-1}$ as past frequency domain estimated SNRs $\mathbf{922}_0$ to $\mathbf{924}_{K-1}$. On the other hand, weighted adders $\mathbf{7071}_0$ to $\mathbf{7071}_{K-1}$ are also delivered with weight 923. Weighted adders $\mathbf{7071}_0$ to $\mathbf{7071}_{K-1}$ execute weighted addition expressed by the above Equation 13, and transfer frequency domain estimated apriori SNRs $\mathbf{924}_0$ to $\mathbf{924}_{K-1}$ to multiplexer 7075. Multiplexer 7075 multiplexes frequency domain estimated apriori SNRs $\mathbf{924}_0$ to $\mathbf{924}_{K-1}$, and outputs the multiplexed SNR as estimated apriori SNR 924. The operation and a configuration of weighted adders $\mathbf{7071}_0$ to $\mathbf{7071}_{K-1}$ will be next described as referring to FIG. 18.

Figure 18:
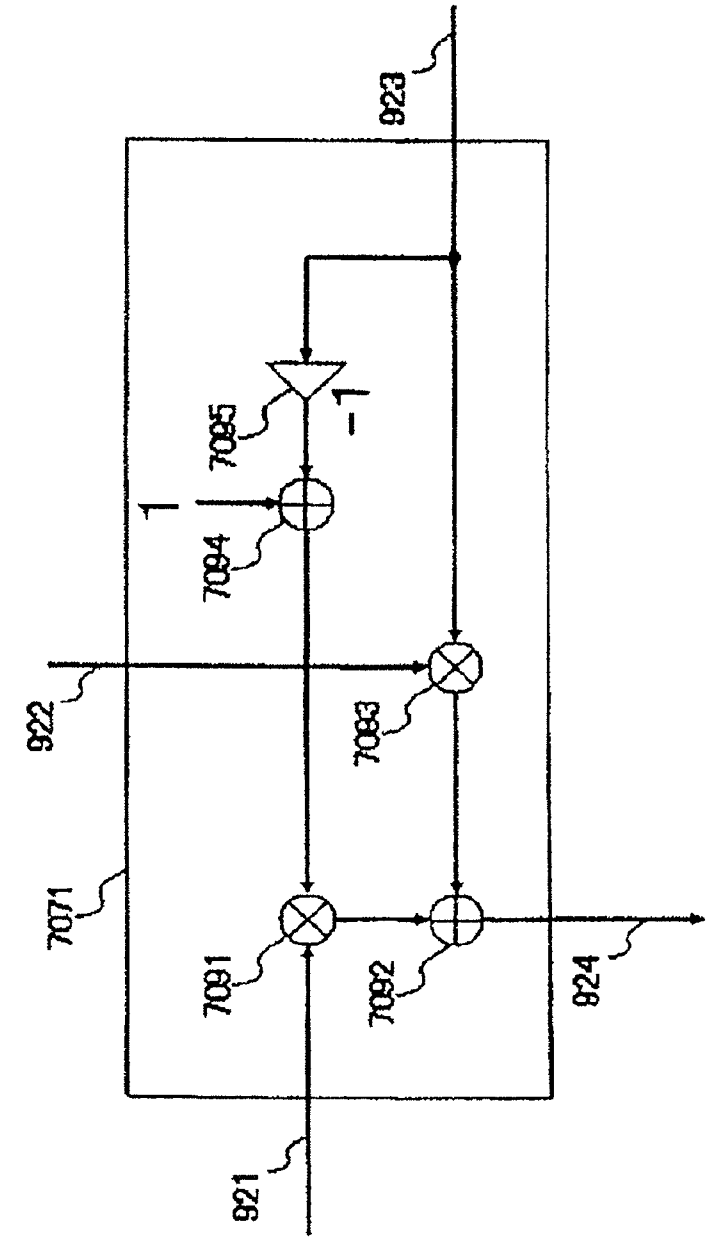
FIG. 18 is a block diagram illustrating a configuration of a weighted adder included in FIG. 17.

FIG. 18 is a block diagram illustrating a configuration of weighted adder 7071 illustrated in FIG. 17. Weighted adder 7071 includes multipliers 7091 and 7093, and adders 7092 and 7094. Weighted adder 7071 is delivered as each input with frequency domain instant estimated SNR 921 from separator 7072 of FIG. 16, past frequency domain SNR 922 from separator 7074 of FIG. 17, and weight 923 from weight memory 706 of FIG. 15. Weight 923 including a value, α, is transferred to constant multiplier 7095 and multiplier 7093. Constant multiplier 7095 transfers −α obtained by multiplying the input signal by "−1" to adder 7094.

The other input of adder 7094 is delivered with "1", and the output of adder 7094 becomes 1−α, a sum of both. 1−α is delivered to multiplier 7091, and is multiplied by the other input, frequency domain instant estimated SNR P $[\gamma_n(k)-1]$, and the product, $(1-\alpha)P[\gamma_n(k)-1]$, is transferred to adder 7092. On the other hand, multiplier 7093 multiplies α delivered as weight 923 by past estimated SNR 922, and the product, $\alpha G^2_{n-1}(k)$ bar $\gamma_{n-1}(k)$, is transferred to adder 7092. Adder 7092 outputs a sum of $(1-\alpha)P[\gamma_n(k)-1]$ and $\alpha G^2_{n-1}(k)$ bar $\gamma_{n-1}(k)$ as frequency domain estimated apriori SNR 904.

Figure 19:
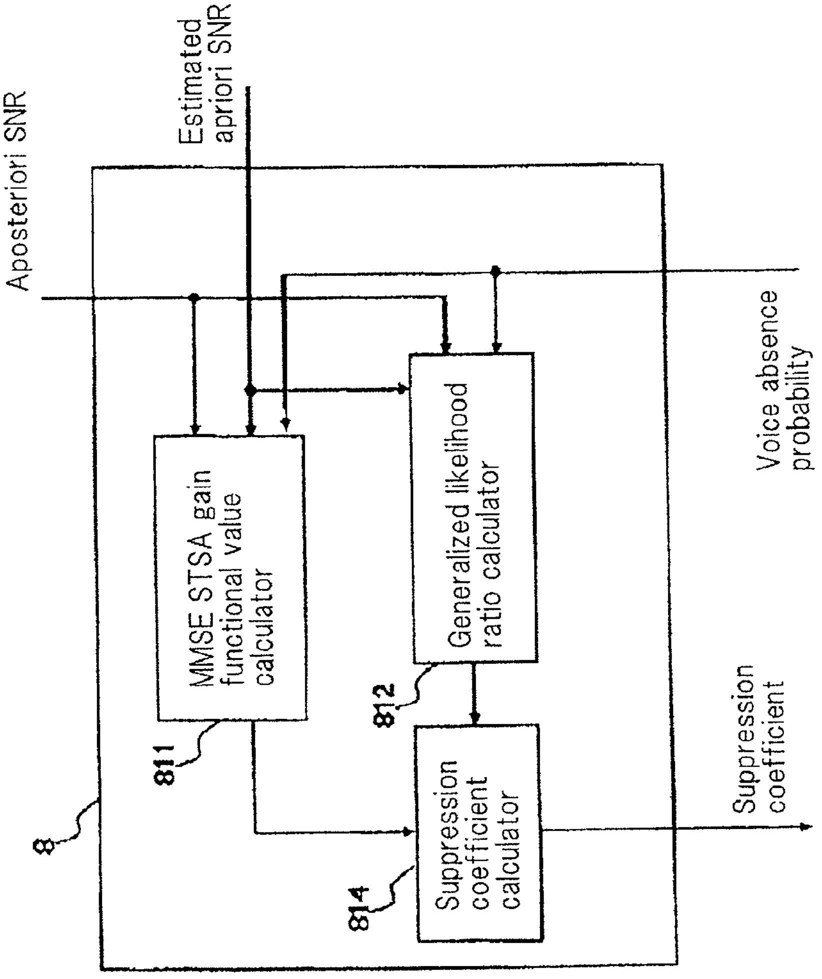
FIG. 19 is a block diagram illustrating a configuration of a noise suppression coefficient generator included in the third exemplary embodiment of the present invention.

FIG. 19 is a block diagram illustrating the configuration of noise suppression coefficient generator 8 illustrated in FIG. 6. Noise suppression coefficient generator 8 includes MMSE STSA gain functional value calculator 811, generalized likelihood ratio calculator 812, and suppression coefficient calculator 814. A method for calculating a suppression coefficient will be described below based on a calculation equation described in Non-Patent Document 2 (IEEE TRANSACTIONS ON ACOUSTICS, SPEECH, AND SIGNAL PROCESSING, VOL. 32, NO. 6, PP. 1109-1121, DECEMBER, 1984).

It is assumed that a frame number is n, a frequency number is k, $\gamma n(k)$ is a frequency domain aposteriori SNR delivered from frequency domain SNR calculator 6 of FIG. 6, $\xi_n$ (k) hat is the frequency domain estimated apriori SNR delivered from estimated apriori SNR calculator 7 of FIG. 6, and q is a voice absence probability delivered from voice absence probability memory 21 of FIG. 6. In addition, it is assumed that $$\eta_n(k)=\xi_n(k)\text{hat}/(1-q),$$

$$v_n(k)=\eta_n(k)\gamma_n(k))/(1+\eta_n(k)).$$

MMSE STSA gain functional value calculator 811 calculates a MMSE STSA gain functional value for each frequency based on the aposteriori SNR $\gamma_n(k)$ delivered from frequency domain SNR calculator 6 of FIG. 6, the estimated apriori SNR $\xi_n(k)$ hat delivered from estimated apriori SNR calculator 7 of FIG. 6, and the voice absence probability q delivered from voice absence probability memory 21 of FIG. 6, and outputs the MMSE STSA gain functional value to suppression coefficient calculator 814.

The MMSE STSA gain functional value $G_n(k)$ of each frequency is expressed by the following equation.

[Equation 14]

$$G_n(k) = \frac{\sqrt{\pi}}{2}\frac{\sqrt{v_n(k)}}{\gamma_n(k)}\exp\left(-\frac{v_n(k)}{2}\right)\left[\begin{array}{c}(1+v_n(k))I_0\left(\frac{v_n(k)}{2}\right)+\\ v_n(k)I_1\left(\frac{v_n(k)}{2}\right)\end{array}\right] \quad (14)$$

Here, I0(z) is 0-th degree modified Bessel function, and I1(z) is 1-st degree modified Bessel function. The modified Bessel function is described in Non-Patent Document 3 (MATHEMATICS DICTIONARY, IWANAMI BOOK SHOP, 374. G page, 1985).

Generalized likelihood ratio calculator 812 calculates a generalized likelihood ratio for each frequency based on the aposteriori SNR $\gamma_n(k)$ delivered from frequency domain SNR calculator 6 of FIG. 6, the estimated apriori SNR $\xi_n(k)$ hat delivered from estimated apriori SNR calculator 7 of FIG. 6, and the voice absence probability q delivered from voice absence probability memory 21 of FIG. 6, and outputs the generalized likelihood ratio to suppression coefficient calculator 814.

The generalized likelihood ratio $\Lambda_n(k)$ of each frequency is expressed by the following equation.

[Equation 15]

$$\Lambda_n(k) = \frac{1-q}{q}\frac{\exp(v_n(k))}{1+\eta_n(k)} \quad (15)$$

Suppression coefficient calculator 814 calculates the suppression coefficient for each frequency from the MMSE STSA gain functional value Gn(k) delivered from MMSE STSA gain functional value calculator 811, and the generalized likelihood ratio $\Lambda_n(k)$ delivered from generalized likelihood ratio calculator 812, and outputs the suppression coefficient to suppression coefficient corrector 15 of FIG. 6. The suppression coefficient $G_n(k)$ bar of each frequency is expressed by the following equation.

[Equation 16]

$$\overline{G}_n(k) = \frac{\Lambda_n(k)}{\Lambda_n(k)+1}G_n(k) \quad (16)$$

Instead of calculating the SNR for each frequency, it is possible to calculate and use the SNR which is common in a band including a plurality of frequencies.

Figure 20:
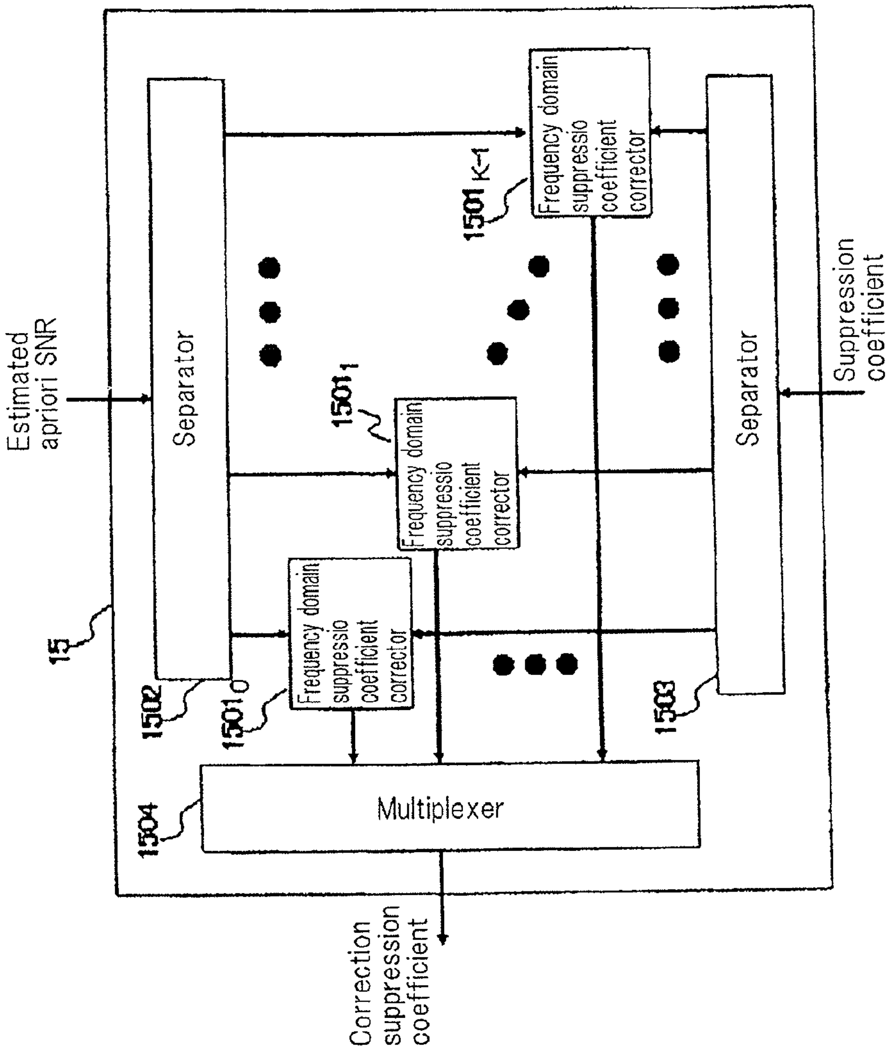
FIG. 20 is a block diagram illustrating a configuration of a suppression coefficient corrector included in the third exemplary embodiment of the present invention.

FIG. 20 is a block diagram illustrating a configuration of suppression coefficient corrector 15 illustrated in FIG. 6. Suppression coefficient corrector 15 includes frequency domain suppression coefficient correctors $1501_0$ to $1501_{K-1}$, separators 1502 and 1503, and multiplexer 1504.

Separator 1502 separates the estimated apriori SNR delivered from estimated apriori SNR calculator 7 of FIG. 6 to frequency domain components, and outputs the frequency domain components to frequency domain suppression coefficient correctors $1501_0$ to $1501_{K-1}$ respectively. Separator 1503 separates the suppression coefficient delivered from noise suppression coefficient generator 8 of FIG. 6 to frequency domain components, and outputs the frequency domain components to frequency domain suppression coefficient corrector $1501_0$ to $1501_{K-1}$ respectively.

Frequency domain suppression coefficient correctors $1501_0$ to $1501_{K-1}$ calculate frequency domain corrected suppression coefficients from the frequency domain estimated apriori SNRs delivered from separator 1502 and the frequency domain suppression coefficients delivered from separator 1503, and outputs the frequency domain corrected suppression coefficients to multiplexer 1504. Multiplexer 1504 multiplexes the frequency domain corrected suppression coefficients delivered from frequency domain suppression coefficient correctors $1501_0$ to $1501_{K-1}$, and outputs the multiplexed frequency domain corrected suppression coefficients to multiplexed multiplier 16 and estimated apriori SNR calculator 7 of FIG. 6 as the corrected suppression coefficient.

Next, a configuration and an operation of frequency domain suppression coefficient correctors $1501_0$ to $1501_{K-1}$ will be described in detail by referring to FIG. 21.

Figure 21:
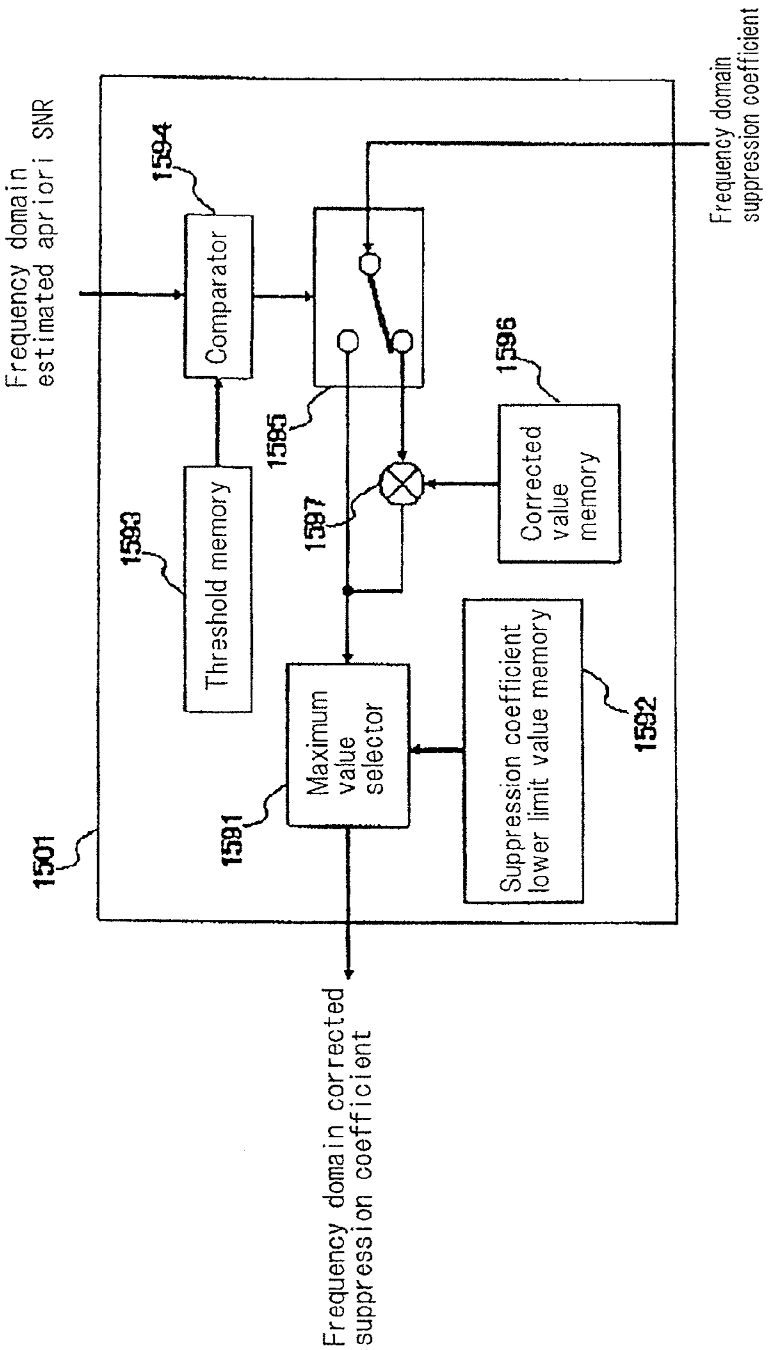
FIG. 21 is a block diagram illustrating a configuration of a frequency domain suppression coefficient corrector included in FIG. 20.

FIG. 21 is a block diagram illustrating a configuration of frequency domain suppression coefficient correctors $1501_0$ to $1501_{K-1}$ included in suppression coefficient corrector 15. Frequency domain suppression coefficient corrector 1501 includes maximum value selector 1591, suppression coefficient lower limit value memory 1592, threshold memory

1593, comparator 1594, switch 1595, corrected value memory 1596, and multiplier 1597.

Comparator 1594 compares the threshold delivered from threshold memory 1593 with the frequency domain estimated apriori SNR delivered from separator 1502 of FIG. 20, and delivers "0" to switch 1595 when the frequency domain estimated apriori SNR is larger than the threshold, and delivers "1" to switch 1595 when the frequency domain estimated apriori SNR is smaller than the threshold. Switch 1595 outputs the frequency domain suppression coefficient delivered from separator 1503 of FIG. 20 to multiplier 1597 when the output value of comparator 1594 is "1", and to maximum value selector 1591 when the output value is "0". That is, when the frequency domain estimated apriori SNR is smaller than the threshold, the suppression coefficient is corrected. Multiplier 1597 calculates the product of an output value of switch 1595 and the output value of corrected value memory 1596, and outputs the product to maximum value selector 1591.

On the other hand, suppression coefficient lower limit value memory 1592 delivers a lower limit value of the memorized suppression coefficients to maximum value selector 1591. Maximum value selector 1591 compares the frequency domain suppression coefficient delivered from separator 1503 of FIG. 20, or the product calculated by multiplier 1597 with the suppression coefficient lower limit value delivered from suppression coefficient lower limit value memory 1592, and outputs a larger value to multiplexer 1504 of FIG. 20. That is, the suppression coefficient certainly becomes a larger value than the lower limit value memorized by suppression coefficient lower limit value memory 1592.

In all the above described exemplary embodiments, while it is assumed that the least mean square error short time spectrum amplitude method is applied as a method for suppressing noise, the embodiments may also be applied to other methods for suppressing noise. Examples of such methods are Wiener filter method disclosed in Non-Patent Document 4 (PROCEEDINGS OF THE IEEE, VOL. 67, NO. 12, PP. 1586-1604, DECEMBER, 1979), and Spectrum subtraction method disclosed in Non-Patent Document 5 (IEEE TRANSACTIONS ON ACOUSTICS, SPEECH, AND SIGNAL PROCESSING, VOL. 27, NO. 2, PP. 113-120, APRIL, 1979), and the description of such detailed configuration examples will be omitted.

A noise suppressing apparatus of each of the above exemplary embodiments can be configured with a computer apparatus that includes a memorizing apparatus which accumulates a program and the like, an operation unit in which keys and switches for input are arranged, a displaying apparatus such as an LCD, and a control apparatus for controlling an operation of each part by receiving an input from the operation unit. An operation of the noise suppressing apparatus of each of the above exemplary embodiments is realized when the control apparatus executes the program stored in the memorizing apparatus. The program may be previously stored in the memorizing apparatus, and may be provided to a user by being written in a recording medium such as a CD-ROM. It is also possible to provide the program through a network.

The invention claimed is:

1. A filter for suppressing a specific frequency component of an input signal, comprising at least:

a first filter that executes a first filtering process for an input signal in a time domain to obtain a time domain filtered signal;

a converter that converts the time domain filtered signal to a frequency domain signal for each frame configured with a plurality of samples; and a second filter that executes a second filtering process for the frequency domain signal in a frequency domain to obtain a frequency domain filtered signal, wherein the first filter suppresses at least a direct current component.

2. The filter according to claim 1, wherein a characteristic obtained by combining the first filtering process and the second filtering process suppresses a component close to a direct current, and passes a voice.

* * * * *